(12) United States Patent
Mertens

(10) Patent No.: US 9,288,489 B2
(45) Date of Patent: Mar. 15, 2016

(54) APPARATUSES AND METHODS FOR HDR IMAGE ENCODING AND DECODING

(75) Inventor: Mark Jozef Willem Mertens, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 170 days.

(21) Appl. No.: 14/112,281

(22) PCT Filed: Apr. 23, 2012

(86) PCT No.: PCT/IB2012/052029
§ 371 (c)(1),
(2), (4) Date: Oct. 17, 2013

(87) PCT Pub. No.: WO2012/147022
PCT Pub. Date: Nov. 1, 2012

(65) Prior Publication Data
US 2014/0044372 A1  Feb. 13, 2014

Related U.S. Application Data

(60) Provisional application No. 61/591,339, filed on Jan. 27, 2012.

(30) Foreign Application Priority Data

Apr. 28, 2011  (EP) .................................. 11164005

(51) Int. Cl.
*G06K 9/36* (2006.01)
*H04N 19/46* (2014.01)
(Continued)

(52) U.S. Cl.
CPC .......... *H04N 19/00545* (2013.01); *G06T 9/007* (2013.01); *H04N 19/46* (2014.11); *H04N 19/98* (2014.11); *G06T 2207/20208* (2013.01)

(58) Field of Classification Search
CPC . H04N 19/00545; H04N 19/46; H04N 19/98; G06T 9/007
USPC ......................... 382/232–233, 248
See application file for complete search history.

(56) References Cited

U.S. PATENT DOCUMENTS 6,879,731 B2 * 4/2005 Kang et al. ..................... 382/274
8,917,293 B2 * 12/2014 Shiomi .......................... 345/690
(Continued)

FOREIGN PATENT DOCUMENTS

| EP | 2009921 A2 | 12/2008 |
| WO | WO2010132237 A1 | 11/2010 |
| WO | WO2012147018 A2 | 11/2012 |

OTHER PUBLICATIONS

Qiu G et al., "Hierarchical Tone Mapping for High Dynamic Range image Visualization", Visual Communications and Image Processing; Jul. 12, 2005-Jul. 15, 2005; Beijing,, Jul. 12, 2005, XP030081051.

(Continued)

*Primary Examiner* — Kanjibhai Patel
(74) *Attorney, Agent, or Firm* — Larry Liberchuk

(57) ABSTRACT

To make available a HDR image encoding mechanism with strongly improved usability, we describe an image encoding unit (301) arranged to encode a high dynamic range image (IM_HDR-in) comprising: —an LDR selector (311) for identifying a low dynamic range of luminances (R_Norml_LDR) or corresponding range of luma code values (R_LDR) within the total range of luminances (Range_HDR) covered by the high dynamic range image; —a HDR selector for selecting at least one complementary range (R_above) within the total range of luminances (Range_HDR), comprising mostly luminances not covered by the low dynamic range of luminances (R_Norml_LDR); —a code mapping unit (315) arranged to encode in a first image (Im_1*), having a luma component comprising N bit code words, pixel luminances of the high dynamic range image (IM_HDR-in) falling within the low dynamic range of luminances (R_Norml_LDR) to code values (Y_out) according to a first mapping (CMAP_L), and pixel luminances of the high dynamic range image (IM_HDR-in) falling within the at least one complementary range (R_above) to code values (Y_out) according to a second mapping (CMAP_H), wherein the first and second mappings map to disjunct subranges of the range of luma code values of the first image (RcTot_Im1).

15 Claims, 7 Drawing Sheets

(51) Int. Cl.
*G06T 9/00* (2006.01)
*H04N 19/98* (2014.01)

(56) References Cited

U.S. PATENT DOCUMENTS

2004/0207734 A1* 10/2004 Horiuchi .................. 348/229.1
2010/0073338 A1* 3/2010 Miller et al. .................. 345/205
2010/0157078 A1* 6/2010 Atanassov et al. ......... 348/222.1

OTHER PUBLICATIONS

Larson G W et al., "A Visibility Matching Tone Reproduction Operation for High Dynamic Range Scenes", IEEE Transactions on Visualization and Computer Graphics, IEEE Service Center, Los Alamitos, CA, US, vol. 3, No. 4, Oct. 1, 1997, pp. 291-306, XP000730965.

Reinhard E et al., "Photographic Tone Reproduction for Digital Images", ACM Transactions on Graphics (TOG), ACM, US, vol. 21, No. 3, Jul. 1, 2002, pp. 267-276, XP007904044.

Francesco Banterle et al., "High Dynamic Range Imaging and Low Dynamic Range Expansion for Generating HDR Content", Computer Graphics Forum, vol. 28, No. 8, Dec. 1, 2009, pp. 2343-2367, XP055031838.

* cited by examiner

APPARATUSES AND METHODS FOR HDR IMAGE ENCODING AND DECODING

FIELD OF THE INVENTION

The invention relates to apparatuses and methods and resulting products like data storage products or encoded signals for improved encoding of images in particular of HDR scenes.

BACKGROUND OF THE INVENTION

Recently new developments have occurred regarding the encoding of images/video (whether of captured scenes or computer graphics), namely, it is desirable to better capture the entire range of object luminances and colors occurring in nature, up to large luminance values like e.g. 25000 nit which can occur in outside sunny environments, or near strong artificial lights, and often also low values like 0.01 nit, which is called HDR (high dynamic range) encoding. There is a push both on the content creation side, e.g. cameras (and even mobile appliance cameras would desire better capturing of actual scenes, especially when being used liberally and simplistically in all kinds of environments such as a mobile phone camera, irrespective of and decoupled from on which rendering system a captured image will later be rendered) or the artificial computer colors spaces of computer games or special effects, as on the rendering side. Since now display of ever higher peak brightness emerge, which by themselves don't define what is required for a HDR rendering chain, but facilitate introducing such. At the moment the typical HDR display is LED backlighted LCD, but if one e.g. relaxes the condition of color saturation, one may also put a monochrome backlight behind an OLED e.g. (the light leaking through creates an RGBW rendering). For several reasons, at least for a number of years into the future, one may desire some form of backwards compatibility, which means that data of a so-called low dynamic range (LDR) encoding must be available or at least easily determinable, so that e.g. an upgraded video processing box can deliver an LDR signal to a lower dynamic range display. Moreover, as will be shown in this text, having available a good LDR representation may prove useful even on long term. The inventor realized that one rationale for having an LDR encoding is that, although displays of ever increasing dynamic range are emerging (high end), there is also a considerable segment of low dynamic range displays (e.g. mobile in an outside environment, projection, etc.). In fact, there may be a need to automatically redertermine for several possible imaging or rendering scenarios the grey values as captured in an image signal, just as one would geometrically scale a picture to show it on displays of different resolutions.

A HDR capturing chain is more than just pointing a camera at a scene with a large luminance contrast ratio between the darkest and the brightest object and linearly recording what there is (capturing ICs such as e.g. a CCD typically being partly (near)-linear). HDR image technology has to do with what exactly the intermediate grey values for all the objects are, since that conveys e.g. the mood of a movie (darkening already some of the objects in the scene may convey a dark mood). And this is a complex psychological process. One can e.g. imagine that psychologically it isn't that important whether a bright light is rendered on a display exactly in a proportion to the rest of the rendered grey values as the scene luminance was to the rest of the scene object luminances. Rather, one will have a faithful impression of a real lamp, if the pixels are rendered with "some" high display output luminance, as long as that is sufficiently higher than the rest of the picture. And there may be a couple of "lamp-light" white levels, but as soon as they are well-apart, their exact code-levels or ultimately display-rendered output luminances may oftentimes be less critical. A grey value allocation between self-luminous and reflecting objects (in the various illumination regions of the scene) is also a critical task depending on the display gamut and typical viewing conditions. Also one may imagine that the encoding of the darker regions is preferably done so that they can be easily used in different rendering scenarios such as different average surround lighting levels (i.e. they may be locally brightened). In general because this is a difficult psychological task, artists will be involved in creating optimal images, which is called color grading. In particular, it is very handy when the artists make a separate LDR grading, even if that is done in a "pure HDR encoding strategy". In other words in such a scenario when encoding a sole HDR camera RAW signal, we will also generate an LDR image, not necessarily because it is to be used for a large LDR fraction of the video consumption market, but because it conveys important information about the scene. Namely there will always be more important regions and objects in the scene, and by putting these in an LDR substructure (which can conceptually be seen as an artistic counterpart of an automatic exposure algorithm), this makes it more easy to do all kinds of conversions to intermediate range representations (MDR), suitable for driving displays with a particular rendering and viewing characteristics. In particular one may tune this LDR part according to several criteria, e.g. that it renders with good quality on a standard reference LDR display, or conveys a certain percentage of the total captured information, etc.

There are not so many ways to encode a HDR signal. Usually in prior art one just natively codes the HDR signal, i.e. one (linearly) maps the pixels to e.g. 16 bit words, and then the maximum captured luminance value is the HDR white in a similar philosophy to LDR encoding (although psychovisually this usually is not a reflective white in the scene, but rather a bright color of a lamp). One could also map a full range HDR signal to the 8 bit LDR range via some "optimal" luma transformation function, which would typically be a gamma function or similar. This may involve losing color precision with corresponding rendering quality issues, especially if at the receiving side image processing such as local brightening is expectable, however the dominant grey value grading of the image objects is roughly preserved (i.e. their relative/percentual luma relationships).

Prior art has also taught some HDR encoding techniques using two picture data sets for the HDR, typically based on a kind of scalable coding concept, in which by some prediction, the precision of a "LDR" encoded local texture is refined, or stated more accurately, projected to a HDR version of that texture, typically by scaling the LDR luminances (the LDR in those technologies is normally not a good looking LDR grade, but typically a simple processing on the HDR input). And then the difference of the original HDR image with the prediction is co-encoded as an enhancement picture to the degree desired. E.g., one may represent a HDR gray value of 1168 with a division by 8 to a value 146. This HDR value could be recreated by multiplying by 8 again, but since a value 1169 would quantize to the same base layer value 146, one would need an enhancement value equal to 1 to be able to recreate a high quality HDR signal. An example of such a technology is described in patent EP2009921 [Liu Shan et al. Mitsubishi Electric: Method for inverse tone mapping (by scaling and offset)]. In theory for these codecs, the inverse tone mapping prediction model (which is the smarter equivalent of a standard multiplier) should be sufficiently accurate to already give a reasonably precise HDR look, onto which minor corrections are applied (indeed, if one projects a range of possible values to another range by using a non-linear function, apart from precision issues, the original range values should be recoverable).

Another two-picture encoding is described in the currently not yet published application U.S. 61/557,461 of which all teachings are hereby incorporated by reference.

That system also works with an LDR and HDR image, and has some similar recognitions which are useful for the present invention too, namely, e.g. the recognition that in an HDR signal one may always find an LDR subregion of major importance, and, it may be interesting to make that LDR an actually usable signal for LDR rendering (e.g. a dedicated LDR grade). And, the HDR information is typically not only non-linearly separate on the luminance axis (i.e. e.g. a lamp having much higher luminance than the white in the scene), but it also has a different meaning Oftentimes one may e.g. speak of HDR effects, i.e. they not necessarily need to precisely code the object textures like the main content of the scene, i.e. its LDR part, but rather depending on which HDR region/effect it is, one may encode it with different criteria like reduced precision, or leave it away altogether. That has as a result that oftentimes a lot of bit budget can be saved for the HDR parts of the scene. Furthermore, encoding in such a LDR+HDR effects part two-picture format has the advantage that both can be very easily separated. Legacy or lower capability systems needing only the LDR can directly extract it ignoring the rest. But also having the HDR as a separately coded picture makes it very easy to apply them in a tuned way depending on the actual gamut capabilities of an actual rendering display, e.g. by adding a scaled HDR effect onto the luminance transformed LDR part.

However, whereas that format works perfectly with systems which are already configured for dual picture encoding, e.g. by re-using the structure normally available for a 3D coding, we would desire similar capabilities in case we have only a single picture coding place holder available. With e.g. the growing field of video on demand, one may imagine that at least some of those systems would prefer to have everything encoded in a single picture signal.

Yet it is an object of at least some of the present embodiments to still have the benefits of encoding such a optimal LDR-within-HDR framework in a single picture, despite the fact that it seems strange to code two pictures into one. Note that the other classes of methods described above, although enforcing some of the data in an LDR picture format mathematically/technically (as a placeholder), do not have real LDR images (co)encoded, i.e. images that would look good on an LDR viewing system, because they have been carefully graded (at least selected, oftentimes further color grading transformed) for their LDR look (rather one may have an "LDR" picture with the right object geometry, but if directly rendered showing severely modified object texture grey values, e.g. the wrong contrast or average brightness).

SUMMARY OF THE INVENTION

A simple and easily usable encoding of HDR images may be realized by embodiment concepts presented herein following principles related to an image encoding unit (301) arranged to encode a high dynamic range image (IM_HDR-in) comprising:

an LDR selector (311) for identifying a low dynamic range of luminances (R_Norml_LDR) or corresponding range of luma code values (R_LDR) within the total range of luminances (Range_HDR) covered by the high dynamic range image;

a HDR selector for selecting at least one complementary range (R_above) within the total range of luminances (Range_HDR), comprising mostly luminances not covered by the low dynamic range of luminances (R_Norml_LDR);

a code mapping unit (315) arranged to encode in a first image (Im_1*), having at least a luma component comprising N bit code words, pixel luminances of the high dynamic range image (IM_HDR-in) falling within the low dynamic range of luminances (R_Norml_LDR) to code values (Y_out) according to a first mapping (CMAP_L), and pixel luminances of the high dynamic range image (IM_HDR-in) falling within the at least one complementary range (R_above) to code values (Y_out) according to a second mapping (CMAP_H), wherein the first and second mappings map to disjunct subranges of the range of luma code values of the first image (RcTot_Im1).

Sometimes the creation of an optimal LDR signal (e.g. showing on a typical LDR display still enough detail in darker parts of the image) may involve some remapping of pixel luminances typically be done by a human artist called color grader (or a smart algorithm analysing various properties of the image, such as e.g. partial histogram properties, from which various contrast measures are derived). However, oftentimes a good LDR variant may be recovered from within a larger luminance HDR range picture. Then only selection of the best LDR picture is needed, but that may usually be a difficult task, so human artist intervention may be required. He may select a subrange R_Norml_LDR of pixel luminances of interesting objects, which should be well-coded and hence well-rendered on the standard LDR display. For simplicity we will assume that that LDR coding may more or less directly function as driving signal for the LDR display, e.g. by applying whichever hardware calibrated transformations are necessary to make the LDR display absolutely or relatively render the original luminances in the LDR range R_Norml_LDR. But of course more complex relationships may be involved, since in theory the LDR need not necessarily be a direct coding of display rendering luminances, but rather may be any separate representation of some luminances in the captured scene. We will however still suppose that the LDR signal is so conditioned that a good quality LDR signal can be (easily) obtained from it (e.g. not that some parts which should be visible are clipped, and hence can never be converted into a good looking region, even if the display has advanced image processing capabilities). There may be e.g. a simple linear contrast compression involved which can later be reversed, but that automatic reformatting is not yet so complex as actual grading of all or some pixel grey values, which may involve local region recoloring, etc. The selection will typically also involve selecting regions which may be coded in a (very) low quality way, e.g. one may clip all regions below a certain luminance to zero, because they will not be shown very well on an LDR viewing system anyway (the system comprising a display with low contrast because of e.g. light leakage and/or bad viewing conditions such as high brightness reflections in an outdoors viewing situation). These regions may be simply excluded from the (encapsulated) LDR encoding, and hence they will be encoded in some way in the HDR part. Typically there will hence be at least one complementary range, which will contain e.g. light sources (or perhaps some part of an outdoors sunny environment) and the grader will then typically decide on how to represent them. I.e. he may consider that for a light source not so many grey levels are needed, but still more than one, because at least some HDR displays may want to render an internal structure of the light source. He may typically use these considerations in a design of the mapping CMAP_H of these colors. Normally the software will be largely automatic allowing him to interact with minimal effort. E.g. he may use an ellipse to roughly encircle the lamp, and then depending on the amount of data needed for encoding the rest of the objects in the picture, the software may automatically allocate (by designing the corresponding CMAP_H) e.g. the two highest code values for that lamp. However, these may not convey enough interior detail, which the grader will see on his HDR standard monitor. He may also check further situations by e.g. lowering the average lightness of that region to roughly emulate how things could look on an even brighter HDR display. If the grader considers this representation is sufficient for an object which is only a light source (something the average viewer may not typically look into for a long time to study its composition, rather when following the story he will look at the faces of the actors or newsreaders etc.) he will accept at least that part of the mapping CMAP_H. Otherwise he may by further interaction e.g. specify that 5 luma code values Y_out will be needed in the output image Im_1* to sufficiently accurately represent that region. Oftentimes less is needed than such an accurate local finetuning of the coding, and indeed, functions like e.g. a gamma function can be used to sample (i.e. represent more or less accurate) to available image object pixels (one can represent each transformation as mapping at least an interval of the total range of an input picture to the standard interval [0,1] and then put a number of digital luminance sampling points in there, according to any desirable non-linear allocation function).

Similarly one may do a lot by choosing an appropriate mapping for the LDR subselection CMAP_L, although one may to represent that part according to pre-existing techniques such as a gamma 2.2 function, since then no additional information needs to be transferred as to what specific mapping (code definition) was used, and hence legacy systems which don't check and update this may just use the encoding as is. However, apart from the mappings (CMAP_L, CMAP_H) defining the encoding into the output image further color mapping transformation (TRF_LDR, TRF_HDR) such as tone mappings, to create additional grey value effects (e.g. instead of an already high quality graded HDR input image a camera RAW capture may be inputted, in which case the grader will grade at the same time he encodes). This allows an easier separation between grey value modifications which are purely done for technical reasons such as compression efficiency (e.g. allocating codes according to visual principles such as JNDs between different codable values), and artistic modifications which e.g. make thunderstorm clouds look more menacing. Note that although the complementary range(s) will usually contain a majority or all pixel lumas not yet covered by R_Norml_LDR, there may be some overlap. E.g. the grader may decide to include some bright (HDR) luminances in the LDR representation, especially if the mapping CMAP_L is not a (pseudo)linear mapping, but if he designs a specific soft-clipping grading strategy. This may e.g. lead to pale sunny exteriors (which not only is what we are used in LDR, but also oftentimes a good mapping strategy for higher dynamic ranges), which however are far from accurately enough represented to be usable for a high quality HDR rendering. The HDR part encoding for the complementary ranges may then recode at least some of these values again, more precisely (e.g. allocating more values to reflective objects in the sun, while reducing the amount of codes available for light sources). This is counterintuitive to normal single picture encodings, wherein a simple coding is defined, if not continuous (and even with a simple tone mapping transfer function defining the relationship between the codes and captured scene luminances), then certainly not non-monotonic. But with the present embodiments it is not only easily doable, but the increased freedom offers advantageous simple uses of the encoded data, such as regrading for tuning to the actual physical specifics of a display and viewing environment (which we call the tunability requirement, a property not present in strictly defined single chain end-to-end display related codings, such as e.g. ITU-R. 601 or 709). Advantageously, the picture encoding may use the technology already in place like 10 bit code words for luma samples, but of course the present invention could work with other values. Note that for reasons of keeping the text and claims simple, we haven't always dug deep into whether a specific realization works on luminances or lumas, since these can be easily converted into each other when one knows the transformation definition. So when we describe that e.g. a range is selected in a luminance representation (like if the e.g. YUV encoding was retransformed to an original scene representation like a linear XYZ of the actual scene luminances or any approximation thereof like a camera captured image), it may also be selected in a corresponding luma (Y) representation, or whatever correlate. Also, transformations which may conceptually be explained as if with intermediate steps towards a universal linking color space, may in practical realizations be immediately realized as one operation combining all steps (even if approximative like in a non-linear color space). The skilled person should have no difficulties in understanding this, as similarly he should understand that if we simplistically explain anything as if pixels had a natural color representation, that in actuality there may be further substeps involved like a DCT transform in an MPEG-standard or similar compressed image or video encoding.

It will be understood that simple variation embodiments will also as equivalents fall under the scope of our claims. Instead of encoding in a luma-based color space like YCrCb, one may of course do a similar division in an LDR and HDR subrange in equivalent color spaces. E.g., one may reserve three unequal or equal regions, e.g. between code 40 and code 750 in an R'G'B' color space (one may typically take into account their percentual contribution to the luma, and desired precision for each channel, etc.), which in this case is easy because of the linear matrix relationship between the two color spaces. In that case instead of characteristic grey values there will typically be characteristic color values, like e.g. Rt1, Gt3, etc.

More advanced embodiments may further comprise a transformation unit (312) arranged to apply a colorimetric transformation to pixel colors of the high dynamic range image (IM_HDR_in) having luminances falling within the low dynamic range of luminances (R_Norml_LDR), to obtain modified pixel luminances (Y*_L) for those pixel colors.

And this is not just for being able to do this, but is very advantageous according to the following technical philosophy. One may select a certain range which is well-graded (i.e. looks fine) in the HDR input signal. However, that need not necessarily have the best look on an LDR system (especially of course if simple mappings are involved, like simplistically just with compression factor 1 selecting all pixels with luminances within a range). One may e.g. imagine that dark colors are selected in the LDR part, and hence well represented in the mathematical codes of the encoded image, but that it is not very easy to convert them into a representation which renders well on any LDR system (rendering and coding are two different conditions which should not be confused, and both very important, so ideally any (coding) system should allow to deal with both elegantly). In this example, the grader may decide to apply any complex grading transform, so that the dark colors look good on the LDR display (typically a lightening which may involve allocating an excessive part of the LDR luma range). However, it is then interesting to be easily able to convert these back into a good representation for a HDR rendering. Typically therefore one will co-encode the transformations used on that subpart of the image in metadata MET, so that one can reverse it on the receiving side. As said before, some information may also be (potentially partially redundantly) encoded in the HDR ranges part of Im_1*, e.g. allowing a look for the dark parts which is dissimilar from the reverse-transformed LDR-coded regions.

It may be advantageous if the LDR selector (311) comprises an identification unit to identify the low dynamic range of luminances (R_Norml_LDR) of the total range of luminances (Range_HDR) on the basis of an input LDR graded image (GRD_LDR_in) and/or metadata characterizing that LDR graded image (TM_G1(gl,gh)).

The present embodiment systems can be used both when only a (pregraded or raw) HDR image IM_HDR_in is present, or when also an LDR version GRD_LDR_in is already present for the same captured scene (e.g. an already pregraded image, computer graphics rendered image, image from another camera, etc.) In that case there has to be an identification of which scene objects, which are usually best represented in that LDR version, are in the HDR image (differently represented). Although complex algorithms may be used (both for identifying the corresponding doubly coded parts, and for mixing both codings of the scene data to obtain a final representation for Im_1*), especially in case of complex redundant codings or gradings (note that it may be advantageous for tunability to be able to use information on similar scene objects, yet according to different grading philosophies of the e.g. LDR vs. HDR grader), the simpler variants may just define the limits of the LDR grading gl and gh. In that case, whatever the pixel color values where in the IM_HDR-in with luminances with the LDR range (R_Norml_LDR), they are now replaced with the color values in the LDR version input GRD_LDR_in (possibly according to a co-encoded or by the local grader currently defined further non-linear mapping within the code interval R_LDR corresponding to that replaced LDR range $R_{13}$ Norml_LDR). I.e. in general there may be a more complex strategy to determine the final color values coded in Im_1* for pixels in that LDR range on the basis of the LDR version GRD_LDR_in, such as by using an image encoding unit in which the code mapping unit (315) is arranged to map pixel luminances of the high dynamic range image (IM_HDR_in) falling within the low dynamic range of luminances (R_Norml_LDR) according to the pixel color values encoded in the LDR graded image (GRD_LDR_in).

Very useful with any embodiments according to the present invention is an image encoding unit comprising an image signal formatter (320) arranged to output in addition to the first image (Im_1*) at least one of a characteristic luminance level (gt4) or a characteristic luma code value (gC4).

Again as said there is a mathematical correspondence to whether one wants to define a characteristic grey value in the (original) luminance domain or in a luma code value domain or similar code domain. Defining one or more of these characteristic grey values has several advantages for several applications. As said before, when demarcating regions such as e.g. a HDR effect region of brighter luminances, they can be used to cut and paste from one representation into another like e.g. Im_1* This allows definition of the meaning of the codes. One may either dispense of them and just define a mapping function (which may range over codes which don't exist because they are not selected in the HDR part mapping with CMAP_H because they are below the complementary range R_above and in the LDR range (or the boundary grey level may be implicitly coded in that mapping function). But one could also use a simple mapping (e.g. linear) and start it explicitly from that special grey value (e.g. luminance g1). This allows converting a generic linear mapping strategy to a specific one, i.e. allows optimal tuning to the present image (because one can therewith skip luminance regions which don't exist in the image, and discontinuously but efficiently (re)start the coding with object luminance lobes which are available. But also defining several such characteristic grey values allows defining several HDR lobes (which in reality may not always be so nicely separated as in our simplistic FIG. 2, but they are separable nonetheless, but typically need the smarts of a human color grader). This allows defining several HDR effects, allowing e.g. to boost an explosion stronger, and diminish the brightness of the outdoors sunny regions, dependent on the physical capabilities of the rendering display, such as its available luminance range, which may depend on hardware limitations such as the available led backlights and their driving constraints to avoid halos. But also within a single lobe, such as the LDR part within R_Norml_LDR one may define interesting grey values, e.g. a dark part of the picture, which is a region selected by the human grader with story-related specific meaning. It may e.g. be a region where not much action is going on like a dark indoors seen through a door. One could blot that out into a single (or perceived as single) black value, but alternatively, although not critical for the story, it may be desirable to at least have some structure in it. By demarcating this dark region from regions which should be rendered more critically, the rendering side can better decide how to actually render it. E.g. if the user indicates on his remote control brightness button that he finds the scene too dark, and can't see some parts well (which should be the darkest parts at least), the television can decide to brighten-up that part. I.e. it may increase the luma of all those pixels, and soft-shift the colors of the luma region above, or even overlap with that one. Further metadata can explain the relationship between these regions, and further aid in the receiving-side processing, e.g. the content provider may enforce that that dark region should always be darker than the one above (whether as an average brightness of the dark and brighter regions, the highest luminance falling below the lowest of the range above, etc.).

In general such characteristic values may be useful for all kinds of applications, but especially in an HDR system, for better coordinating receiving side (in an image processing box like a settopbox or computer, or in a display, etc.) image processing operations, in particular optimal tone mapping for creating visually better renderings. In an LDR system although some characteristic points may exist they are not needed. The white point is just the maximum luminance/luma value. However, in HDR several whites may exist (a white paper lying in a shadow, or outside in the sun, and the even brighter light source color is not really a white (which should be a reflective color) but a "bright"). Of course there can be even more interesting blacks and greys, allowing in a very simple way a semantic definition of the scene. This is especially useful if the receiving side wants to use global image color/luma transformations, but then typically needs to adjust them closely corresponding to the actual image content, in particular the object textures color distribution as captured and encoded.

So these characteristic grey values are useful for any HDR definition in a single (or several related) picture(s), in particular in or coordinated around a predominant LDR part. More interestingly one may give these regions more semantic data, such as name codes or allowed operations, like "dark region", "allowed to brighten for better object visibility, but should stay psychologically rendered in the total rendered image as darkish". Note that the latter depends on the other colors present in the rendered image, and further viewing conditions which lead to the viewer seeing certain colors, but since this is not the main component of the present invention we will not needlessly further elaborate on that here.

Similar technical transformations which the encoding unit apparatuses above can realise can be done in other technical ways enabling a method of image encoding of a high dynamic range image (IM_HDR-in) comprising:

selecting a low dynamic range of luminances (R_Norml_LDR), or corresponding range of luma code values (R_LDR), within the total range of luminances (Range_HDR) covered by the high dynamic range image;

selecting at least one complementary range (R_above) within the total range of luminances (Range_HDR), comprising mostly luminances not covered by the low dynamic range of luminances (R_Norml_LDR);

mapping to luma codes of a first image (Im_1*) having at least a luma component comprising N bit code words, pixel luminances of the high dynamic range image (IM_HDR-in) falling within the low dynamic range of luminances (R_Norml_LDR) to code values (Y_out) according to a first mapping (CMAP_L), and pixel luminances of the high dynamic range image (IM_HDR-in) falling within the at least one complementary range (R_above) to code values (Y_out) according to a second mapping (CMAP_H), wherein the first and second mappings map to disjunct subranges of the range of luma code values of the first image (RcTot_Im1).

Which method of image encoding of a high dynamic range image (IM_HDR-in) may further comprise performing a color grading for pixels having luminances within the low dynamic range of luminances (R_Norml_LDR), etc., any of the above subtechologies having pendants in technically materialized methods, in particular for producing as products image encodings.

Mirror-image technology of the transmitter side may be constructed on any receiving side (whether final destination or intermediate) like e.g. an image decoding unit (651) arranged to obtain a high dynamic range image (IM_HDR_out) from a high dynamic range image encoding (Im_1*) comprising:

an LDR recovery unit (656) arranged to determine a low dynamic range of luminances (R_Norml_LDR), or corresponding range of luma code values (R_LDR), within the total range of luminances (Range_HDR) covered by the high dynamic range image, and arranged to obtain a low dynamic range image (Im_LDR_o) from the high dynamic range image encoding (Im_1*);

an HDR recovery unit (655) arranged to determine at least one complementary range (R_above) within the total range of luminances (Range_HDR), comprising mostly luminances not covered by the low dynamic range of luminances (R_Norml_LDR), and arranged to determine at least one high dynamic range subimage (ImP_HDR_o) from the high dynamic range image encoding (Im_1*) corresponding to that at least one complementary range (R_above);

an image composition unit (657) arranged to compose the high dynamic range image (IM_HDR_out) from the low dynamic range image (Im_LDR_o) and the at least one high dynamic range subimage (ImP_HDR_o), whereby the low dynamic range image (Im_LDR_o) and the at least one high dynamic range subimage (ImP_HDR_o) cover largely non-overlapping luminance subranges of the high dynamic range image (IM_HDR_out).

The particular coding structure within Im_1* may aid in separating the LDR sub-part from the HDR sub-part(s), and correctly reconstruct a final HDR image IM_HDR_out, e.g. for direct driving of a display like a television or portable display, or other use like storage possibly with further color image processing.

We would like to note that although we defined the receiving side in the luminance domain, an embodiment of a decoder may typically identify the LDR and HDR parts in a luma domain (where they are disjunct normally), but that can easily be converted to and fro to a luminance specification (i.e. the decoder will also usually map to luminances ranges, especially if that format is used for final output of the HDR image, or at least correlates via color mapping thereof).

In simple technical variants, both coder and decoder may know (not just in embedded system, but also e.g. television transmission standards) in which subpart the LDR subimage is residing, e.g. always between 0 and CLDRh e.g. 850. For driving a legacy display, the image receiving box (which for simplicity we may as a metonymy also call settopbox also meaning any other intermediate or final apparatus or component like IC or board having image processing capabilities like e.g. a portable computer formatting for a wireless linked mobile phone rendering the final picture) may then just select the LDR subimage and use it for driving the final display (potentially with further color mapping). Even more legacy settopboxes may be fooled in directly using the LDR part in case the HDR part is encoded in an extended version of a basic signal which need not be recognized and used by all systems (e.g. the older system thinks the signal can only go from 0 to 800 and considers all other codes as errors or at least irrelevant codes for it, and just discards them, but the newer or smarter settopboxes know also how to use that smartly encoded out of range data (e.g. in full 10 bit range 0-1023, or a smaller subrange thereof allowing further "other_relevance" codes).

As already mentioned above when an image decoding unit (651) comprises a characteristic grey value identification unit (661), arranged to extract from input metadata (MET) at least one of a characteristic luminance level (gt4) or a characteristic luma code value (gC4), it may apply much smarter image processing applications to the decoded image. These gray values may not only be used for deformating the image encoded in Im_1* into a most optimal output HDR image IM_HDR_out, but also (if not necessary for that e.g.) allowing further transformations like e.g. optional boosting or brightening of a subregion or effect, or more easily interpolating coded regions for display environment tunability.

Further interesting modifications are e.g. an image decoding unit (651) in which the LDR recovery unit (656) is arranged to determine a low dynamic range of luminances (R_Norml_LDR) on the basis of the characteristic luminance level (gt4) or the characteristic luma code value (gC4), or an image decoding unit (651) comprising a tone mapping unit (658) arranged to transform pixel colors at least when their luminances or lumas fall in a subrange of luminances or lumas of the high dynamic range image (IM_HDR_out), as defined by the characteristic luminance level (gt4) or the characteristic luma code value (gC4) respectively, or an image decoding unit (651) as claimed in claim 11, in which the tone mapping unit (658) is arranged to apply a brightening transformation of at least pixel colors having luminances or lumas below a certain threshold, preferably depending on a measurement of surround illumination (Surr_IL) from a light sensor (688).

As said above, having on or more characteristic grey values characterizing a darker region allows to better tune its final rendering e.g. depending on what the display can actually make visible in a certain viewing environment. Also if there are several dark regions, they may be better coordinated as to their color-rendering characteristics with further chacteristic grey values (e.g. where overlap between the two regions may start).

All the above and below can also be embodied in methods like a method of image decoding to obtain a high dynamic range image (IM_HDR_out) from a high dynamic range image encoding (Im_1*) comprising:

determining a low dynamic range of luminances (R_Norml_LDR), or corresponding range of luma code values (R_LDR), within the total range of luminances (Range_HDR) covered by the high dynamic range image, and obtaining a low dynamic range image (Im_LDR_o) from the high dynamic range image encoding (Im_1*);

determining at least one complementary range (R_above) within the total range of luminances (Range_HDR), comprising mostly luminances not covered by the low dynamic range of luminances (R_Norml_LDR), and determining at least one high dynamic range subimage (ImP_HDR_o) from the high dynamic range image encoding (Im_1*) corresponding to that at least one complementary range (R_above);

composing the high dynamic range image (IM_HDR_out) from the low dynamic range image (Im_LDR_o) and the at least one high dynamic range subimage (ImP_HDR_o), whereby the low dynamic range image (Im_LDR_o) and the at least one high dynamic range subimage (ImP_HDR_o) cover largely non-overlapping luminance subranges of the high dynamic range image (IM_HDR_out).

And it can be embodied in other known technical components like e.g. a computer program product comprising software encoding the method of 6 enabling a processor to implement it, or a computer program product comprising software encoding the method of 13 enabling a processor to implement it, or an image signal encoding a high dynamic range image (IM_HDR_in), characterized in that it comprises at least an encoding codifying a two-dimensional luma picture, having a mapping (CMAP) of luma code values (Y_out) onto to be rendered luminances (Lum_in_scene), in which a low dynamic range of luminances (R_Norml_LDR) covers an encoding of a low dynamic range image (Im_LDR_o) conditioned as to its color characteristics for rendering on a low dynamic range display system, and a non-overlapping complementary subrange (R_above+$R_{13}$ below) covers high dynamic range pixel colors, usable for rendering the dynamic range image (IM_HDR_in) on a high dynamic range display system.

Or an image signal as claimed in claim 16, further comprising at least one of a characteristic luminance level (gt4) or a characteristic luma code value (gC4), which may be comprised in various memory hardware components, such as e.g. a removable data carrier, such as e.g. a blu-ray disk.

In the definition of the image signal we mean by an encoding codifying a two-dimensional luma picture, that the luma picture need not be a direct encoding of luminances of pixels in the same location, but may be a typical transformation thereof like a DCT transform (but that new picture still codifies the underlying original pixel luma picture). With the conditioning according to its color characteristics of the LDR image, we typically mean a grading, which usually will be done in such a way that the LDR (sub)image looks nice when rendered on an LDR display system (sufficient contrast, no strange colors, sufficient HDR effects like explosions still included etc.). So the technical novelty of the present embodiments can immediately be seen in the various signal realizations in the way the LDR and HDR parts are interwoven in the luma definition. The LDR subrange of that luma range may have been pre-agreed (e.g. between 12 and 1400) in a standard signal, or may be communicated by means of characteristic grey values. It allows versatile further coding/transformation of the parts. Of course also the—typically co-encoded-mapping functions CMAP_L and CMAP_H may identify the subparts.

Many further variants of the below described embodiments are of course possible, and the skilled person understands that they may e.g. be realized in different apparatuses in different geometrical regions of the world, applying their partial functionality at different moments in time, or several times after each other, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 1:
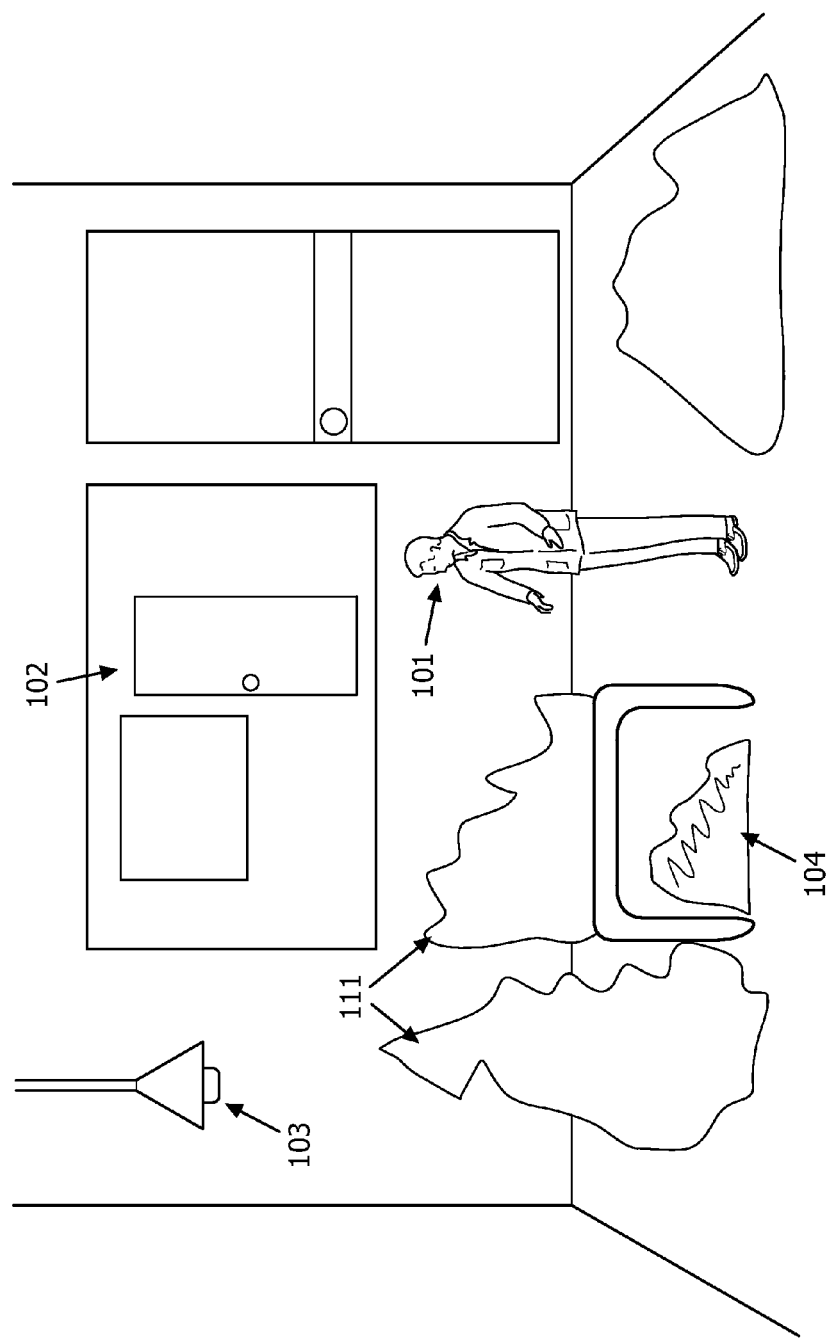
FIG. 1 schematically illustrates a scene with a high dynamic range of luminances.

FIG. 1 shows a typical scene giving rise to a need to encode a high dynamic range (HDR) image as good representative, to be able to reasonably render the scene. The renderer, even if as typical not capable of exactly reproducing the scene colors (as this involves not only display limitations but also the adaptation of the visual system of the human viewer), still needs as accurate as possible information about the original scene.

There is not just an issue of encoding the scene luminances/colors with enough precision (which may e.g. be selected so that for to be expected display side transformations like luminance stretching, we stay on the safe side, i.e. there are enough codes so that no noticeable artefacts like banding occur), but rather, there is a kind of hierarchy of representations with a certain quality of achievable range. This can be seen as a kind of "exposure focus", just like a movie director or photographer can select an object in focus and blur all the rest, he can for reasons of physical limitations or artistic regions select a range of luminances which needs to be perfectly reproduced or at least encoded (e.g. because it contains the main actor 101), and further regions, which in some renderings may be blotted out, but in others represented in a particular way.

In the example we have a shop with some stuff, some of it on a table, wherein the main action occurs. These main region objects 111 should be well represented, i.e. whether that is in any lower quality encoding like an LDR image, or another encoding like a HDR image.

In a television show production, these main objects are typically well-illuminated by the lighting designer. In an on-the-fly reporting, the cameraman will adjust his camera aperture so that the main objects will fall roughly around the middle of his LDR range.

Figure 2:
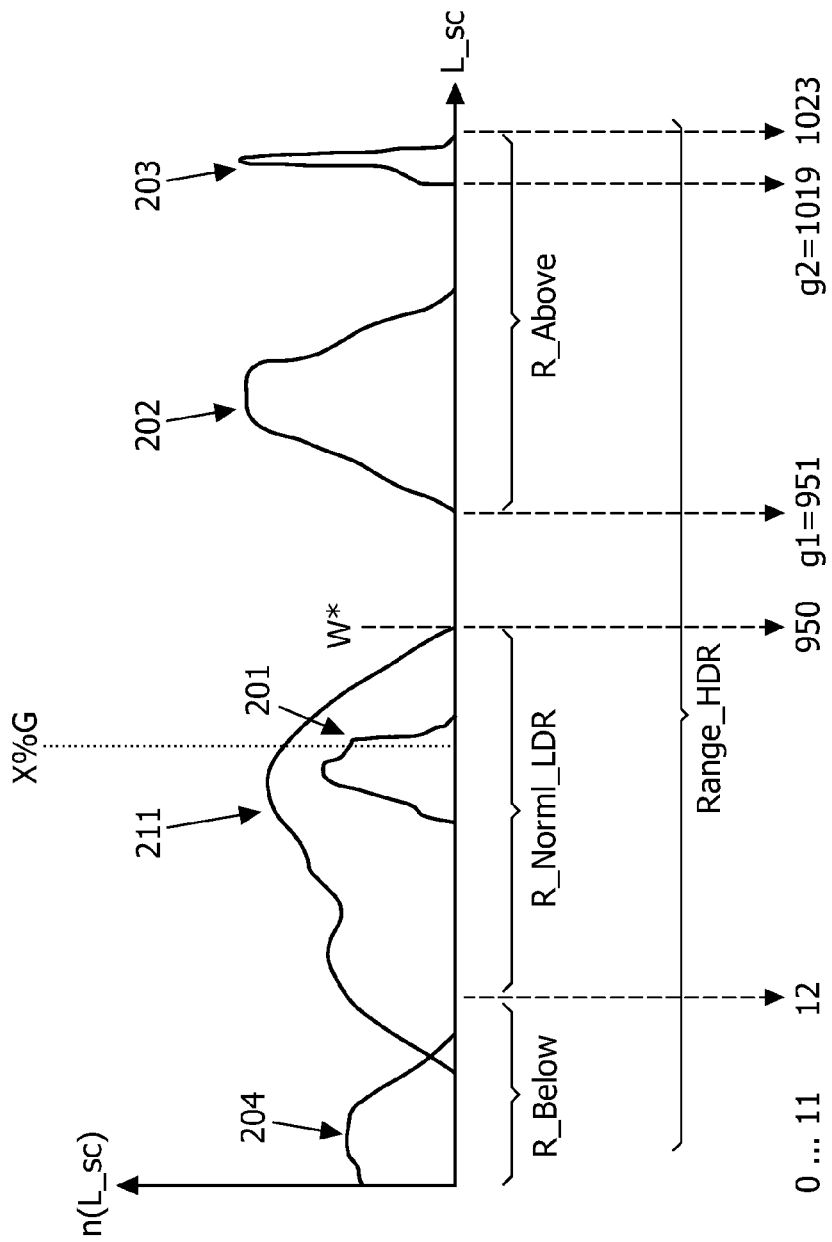
FIG. 2 schematically illustrates what that scene to be represented looks like in terms of the linear luminance of scene regions.

In FIG. 2 we see the equivalent luminance histograms of count n(L_Sc) versus luminance L_sc for the scene (or at least how a high quality camera would measure them approximately). The main objects (luminances schematically represented with main lobe 211) should all fall approximately well in an LDR range of luminances R_Norml_LDR (i.e. depending on the actual scene contrast that could mean that they fall in a subset of that range for low contrast objects, usually objects having reflectances between 1% and 100% with reasonably uniform illumination should also fit within the range R_Norml_LDR, and for higher ranges—providing the soft-clipping of the camera to e.g. JPEG or MPEG encoding is insufficient—a minor amount of the main object pixels may clip to the outer values of the LDR code, i.e. e.g. 0 and 255). Typically the LDR region ends with some white W*, mapped to 255 in an 8 bit LDR representation (and typically the white may also be made present in the image as captured, e.g. a camera auto-exposure function may—apart from doing generic calculations like a grey world hypothesis—look for the brightest objects and map these to 255-white). In it there may be regions with critical grey value x % G, e.g. the lobe 201 of the main actor should not be too dark (nor too pale).

In a scene of the kind exemplified with FIG. 1, there will also be regions of significantly higher luminance than the main region, e.g. a bright region 102, as seen in the sun outside through the window. Its histogram, indicative of the reflectivities of its objects, falls in another region of the total HDR range of luminances Range_HDR (as can be measured in the scene with a photometer, or the approximation from a capturing with a high dynamic range camera, or a computer graphics representation, etc.), namely a bright range R_above. If there are only bright objects in the scene, that range R_above is complementary to R_Norml_LDR, not necessarily in a continuous/adjacency manner, but in that it contains all other pixel luminances of objects present in the scene. In the example R_above contains luminances of even brighter region, namely the light region 103 of a lamp in the shop, with light histogram 203. A low quality will often clip such higher luminance regions, or at least represent them incorrectly e.g. with pale, desaturated chromas.

Oftentimes there will also be very dark regions, like in this case the dark region 104 of objects in the shadow under the table. It has the dark histogram lobe 204 falling in dark range R_Below. Again, in coarser versions of the image they may not be so relevant. E.g., in another HDR scene where one shoots from outside, what is inside the house (as e.g. seen through an ajar door) may be rendered as (near) black, and the viewer may not see it. However, one can imagine that better than also to then encode it badly (especially if the camera can well-capture that data), one could well-represent also those dark interior object pixels with a sufficient amount of allocated codes. An LDR rendering on an LDR system which cannot faithfully render those dark regions in relation to the brighter ones, may then from that (additional) data decide to apply a color transformation which, while retaining enough of the darkish look, by brightening does show somewhat of the object structure behind the door of the house in the dark room. This is what can be done with a HDR encoding, which in principle could encode whatever extreme luminance pixel in the scene, whether or how it would be used later or not.

Figure 4:
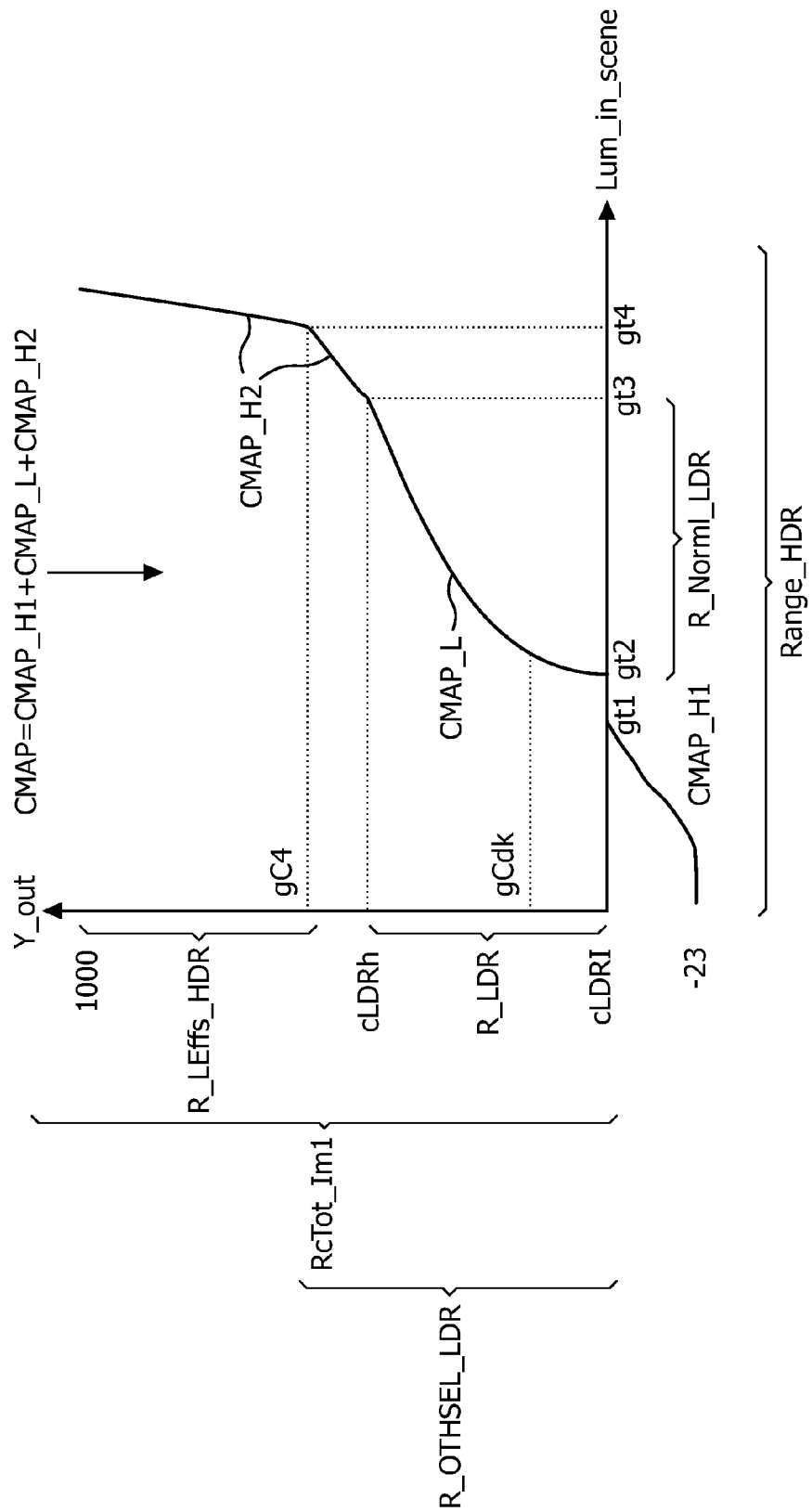
FIG. 4 schematically illustrates a luminance-luma relationship allowing to encode both a LDR representation and at least HDR information parts of a HDR representation in a single picture luma structure elucidating some principles of the present invention.

FIG. 2 also shows how the present inventive ideas can accommodate such a encoding, which is further clarified with FIG. 4. If one e.g. uses a 10 bit data word already predefined as a data structure, one may encompass a directly usable (!) LDR signal somewhere in the HDR range [0-1023], and that will most optimally encode that part of the HDR range (irrespective of how it is encoded, e.g. non-linearly contrast-modified, and what exactly is done with the remainder of the HDR range). What is now counter-intuitive is what is done with the rest of the HDR range. Normal sense would dictate one just continues in the same way of coding beyond the LDR subpart, as far as the range of the 10 bit "placeholder" luma data structure allows. I.e. the mapping transfer function defining the code would be a simple continuation (of usually a simple function like a gamma function), and not a discontinuity (let alone a non-monotonous allocation which our invention would in some scenarios find very useful). The idea is that then if some error is made (some rounding error, or shift of luma values downwards due to some image processing), due to the minor difference in corresponding scene luminance-meaning of adjacent codes, no significant visual modification would occur. We think in the present digital age it should be possible to exactly demarcate one subrange from another, and hence altogether avoid any such problems, even if an adjacent luma code (e.g. 951 vs. 950) contains data of a very different meaning, namely a very different scene object luminance. Furthermore, due to the specific nature of the color-encoding of HDR, even if a problem should occur, it will usually not be so severe. Erroneously (or on purpose) putting some HDR bright luminance data in the higher codes of the LDR range R_Norml_LDR should not be such a problem since the LDR image is clipped for high brightness objects anyway (and a difference between lumas 253 and 255 is hardly perceptible also). And should a mistake occur in the HDR part, usually those apparatuses handling that data should be smart enough to spot and correct it (e.g. by detecting a gradient which is incongruent because it maps to what should be an LDR encoded region).

Anyway, that rationale allows smart non-linear coding of exactly those pixel luminances which are still needed or desirable for an HDR look. I.e., one may e.g. reserve a small amount of luma values 0-11 for the dark region. That should be enough information allowing a complex non-linear mapping function to create one or several nice dark region renderings. Since the dark region is never going to be of paramount importance, one may e.g. apply the rendering so that the dark luminances become just noticeable differences, or in other cases (e.g. higher brightening) there may be larger steps which results in some posterization, but that is still acceptable usually for such a shadow region of minor importance. Since in this example there is no further scene luminance of special significance (which might be the case if some darkish room with higher average luminance is imaged, which may in view of its rendering requiring a subhistogram-coding of more luma codes), one may start with the luma code directly above (12), the definition of the LDR range of major significance. And that is irrespective of whether there is a luminance gap with the dark region, or whether there is overlap (in which case some of the pixels may even be redundantly coded in the LDR part also, e.g. the brightest pixels 11 in lumas for the HDR coding corresponding to R_below, may depending on a more precise quantification of their scene luminance obtain a recoding of one of the three lowest LDR codes, i.e. creating a further object texture definition with the pixel values 12, 13 and 14). Similarly, the scene luminance corresponding to the luma 951 may depending on the scene content be two times as high as the luminance corresponding to luma 950 (instead of being e.g. 2% higher), or three times etc.

In general it may be useful to co-encode special grey values demarcating such regions. I.e. more versatile than fixing a fixed subregion for the LDR part, one may communicate with the characteristic grey value (in this case luma value) g1=951, that there the (first) HDR part of the encoding starts, and preferably one further co-encodes typically in metadata MET associated with the picture encoding, that this luma value 951 corresponds to a scene luminance of e.g. 2000 nit. The display side can then determine how to visually optimally render that on a display with a local peak brightness of say 3000 nit, i.e. also reserving sufficient room for the image regions of even higher brightness. And potentially taking into account user settings such as that the user prefers images which are not too bright to his eyes, or which use less than the 3000 nit for energy conservation purposes.

Figure 3:
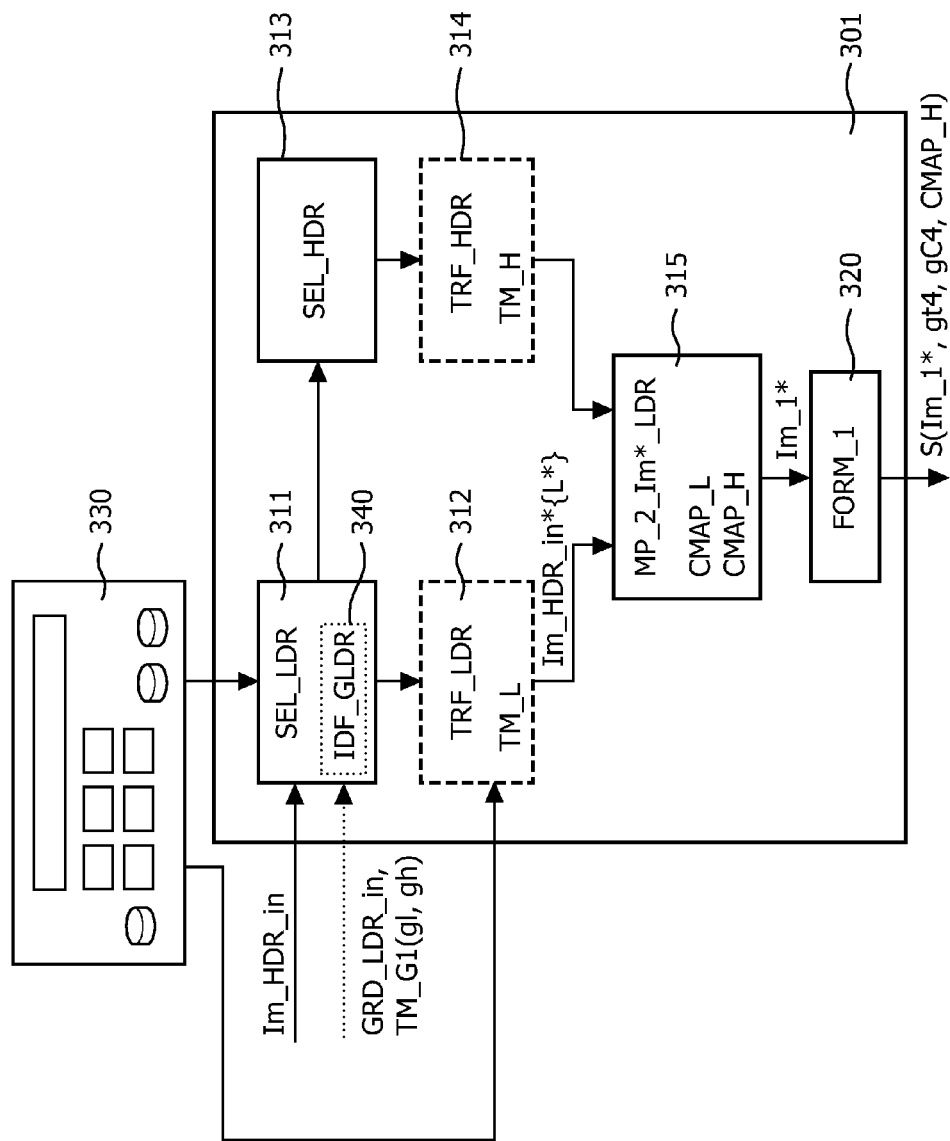
FIG. 3 schematically illustrates an encoder embodiment which can encode a HDR image according to principles of the present invention.

FIG. 3 shows schematically some embodiments which may be present in an encoder. There will always be some LDR selector allowing to identify the LDR range, and typically characterize it. We suppose it is not yet separately graded, i.e. there is e.g. just a raw camera image from an HDR camera, or an optimal HDR master grading according to the preferences of the director and DOP. We will denote this with the inputted high dynamic range image IM_HDR_in. At minimum typically a human (or smart algorithm) will identify which is the LDR part in that image, i.e. those scene regions that should be rendered optimally on a standard LDR viewing system, i.e. with good contrast, visibility of structure also possibly in some darker parts, the right colors for the human faces, etc. Typically also sacrifices need to be made identifying at least implicitly the regions that are not well covered by the LDR encoding/subpart. I.e. e.g. some brighter regions may be soft-clipped deleteriously reducing the amount of luma codes still characterizing the object texture there, or even hard clipped, i.e. not represented at all. But the human may consider that reasonably for e.g. a dark shadow region, or bright street light. Optionally in many embodiments of the encoding unit 301, there may also be a color/luminance transformation unit 312, allowing the grader to still e.g. non-linearly brighten some part of the shadow regions before cramming it into the lowest lumas of the LDR subpart. I.e., having units for such a separate color grading at the time of creating the coding, allows nicely a decoupling from the final technical mapping of raw luminances of captured object to final luma codes in the single image Im_1* to be output (at least single a far as a single view is needed, of course there may be e.g. multiple 3D views for each time instant, or even further images may be present which may be alternative HDR encoding, or medium dynamic range (MDR) gradings, etc.). In this way one may e.g. use a standard gamma 2.2 mapping CMAP_L for the LDR part. In this case any legacy LDR system may directly use the LDR subrange—isolating it by the mere thresholding operation—and some of the smartness of the HDR scene encoding has hence be realized by appropriate grading into the LDR range R_Norml_LDR.

In any case, the grader will typically select a smart HDR mapping (second mapping CMAP_H) for encoding the HDR parts into what remains in the range. For e.g. a 10 bit image, still 1024−256 is 768 luma codes remain, which should be sufficient for quite some HDR scenarios. However, if one were to encode the LDR image approximately (by further smart mapping or sacrificing 1 bit accuracy by scaling) in 7 bits of an 8 bit total luma range, then the remaining amount of codes would be 256−128=128. This should still be sufficient to generate an outside sunny region of the same precision as the main region, yet, the reduced amount of codes may already require doing a smarter management of HDR effects. E.g., one might decide to reserve 120 of those codes for the sunny regions (102), only 2 luma codes for lamps (103) which then are coarsely represented, and only 6 for dark regions (104), which then also are no longer represented with high accuracy. But then the advantage is that an entire HDR signal can fit a 8 bit format, and any decoder can easily, whether for a legacy system or HDR system, isolate the optimal LDR (7 bit) range of 128 codes (e.g. starting a luma 7), and scale it to 8 bit for direct rendering, and where needed easily tear-out the various HDR region codings, and then map them e.g. in a brightness boosting scenario for creating bright lamp region renderings etc., to obtain a final HDR image Im_HDR_out (which we will for simplicity consider a direct driving image, the skilled person understanding further modifications like taking into account a different display gamma, display calibration, etc.).

Similarly it may be useful if a HDR selector 313 is comprised, which may allow the grader via a user interface unit 330 (typically a dedicated grading board and software) to e.g. deselect some HDR regions (not so important to encode), or separate them into distinct parts of special semantic meaning etc. In this way, he can e.g. tune the HDR second mapping CMAP_H to optimally encode in lumas the bright mode 202 versus the light mode 203. It may be useful to have an optional HDR color transformation unit 314 to apply one or more tone mappings (or in general color mappings) TM_H to the various HDR region pixel color/luminance values, mutatis mutandis to tone mapping with an LDR tone mapping TM_L by the LDR color transformation unit 312.

A code mapping unit 315 applies the encodings via mappings CMAP_L and CMAP_H, which may be predefined (e.g. agreed in a certain field of technology), or optimally designed by the grader and co-encoded in the metadata of the outputted image signal S. This image signal may also comprise one or several interesting grey values, which may be encoded as characteristic luminance value (e.g. gt4) and/or characteristic luma values (gC4), and which as mentioned before aid in e.g. decoding to which output luminance luma code 951 should finally be rendered, potentially in e.g. a user-tunable manner. A formatter 320 will format the image Im_1* in the signal S, and the skilled person will understand this may involve by compatibility such common technologies as DCT transformation etc. to obtain an MPEG-compliant stream, packetization, structuring according to a blu-ray specification, etc., whatever the technology implementing the present inventive concepts demands.

In case an LDR grading GRD_LDR_in is already present, it will typically be co-inputted. Further inputted metadata may aid in identifying it with a particular range in the HDR range Range_HDR, e.g. a specification of a used mapping TM_Gl in arriving at the LDR grading. Typically the LDR selector 311 will then comprise an LDR identification unit 340 which is arranged to do a mapping between the input LDR grade and the input HDR image. The most complex embodiments may do a full spatial-color image analysis, e.g. identifying similar objects (e.g. via boundary detection and matching), analyzing how the grading is in both image, propose or implement an automatic further color/luminance mapping transformation (e.g. making the final LDR grade to be encoded an in-between variant of the LDR and HDR grades which are inputted), etc. In some embodiments feedback to the grader looking at the images on his display(s) may be giving in the form of e.g. pseudocolors showing which objects in the HDR rendering correspond to the LDR input (or current to be output) encoding, and allow showing the color transformations, potentially exaggerated, differentially compared, etc.

Although various advanced concepts can be envisioned depending on how exactly the LDR encoding relates to the HDR image (e.g. was a smart tone mapping used to already incorporate a large part of the bright region 202 of the sunny outdoors), simple systems may just define two thresholds gl and gh of lumas (or luminances which can be calculated from each other) where to cut and replace in the HDR image. In this scenario the LDR grading may directly bypass or run through without processing the LDR color transformation unit 312, rather than that a modified low dynamic range region is generated from the IM_HDR_in embodied e.g. by unit 312 calculating a modified HDR image IM_HDR_in* with unchanged luminances in the HDR regions but different luminances L* in the LDR region.

HDR image encoding, and in particular the present embodiments, allow to create visually totally different scenes, e.g. conveying a different mood. The natural paradigm is to always have at least the main action in the scene well rendered (i.e. optimally visible), which typically leads to putting the main objects "in the spotlight". However, already in the Renaissance man discovering his minor position in the universe, led to new kinds of images like darkish vanitas paintings. The discovery of artificial lighting in the nineteenth century led to the artists playing with this wonder. Apart from the daylight world, now also the night was discovered. And grey values in such night images depend on how a scene is lit. E.g. a small, weak point source like a candle, may have the effect that in the total rendering more or less of the object regions will be lit. Note that psychologically a dark experience can already be created by only making some objects or parts of the image dark, while keeping the rest lighter. So there will be a range of luminances from very bright on the light source, fainting away to a theoretical value of zero. The question is now where the action occurs. One actor can be reasonably well lit by the candle, but a second action (especially in a horror movie) may happen in a darker region. With the present invention one could decide not to select the LDR range nicely centered around all the colors in the second actor's face, but to put his pixel colors in the bottom part of the LDR range, even e.g. clipping the darker less-illuminated half of his face to zero (LDR value, i.e. e.g. 12 in the single image Im_1* HDR encoding). In that case his face will correctly render very obscure in an LDR rendering. One may then encode these dark facial halve pixels in the HDR part (R_below), so that a HDR system may decide how to show them with more texture (e.g. a HDR display may be able to generate much darker pixel luminances accurately, even if under a certain illumination they will seem indistinguishable to the human viewer, hence realizing a same obscure look as on the LDR display, perhaps from far away, while upon a closer look the texture does start to show).

FIG. 4 shows a schematic example of how one may encode with the present embodiments an input range of "grey-related values", which we will again assume to be linear scene luminances (so a particular encoding like e.g. with a non-linear luma, or whatever mathematically defined grey-correlate in a color space, e.g. coming from a computer graphics device, may always be transformed in such a equivalent luminance (Lum_in_scene) representation) into the lumas Y_out of the output image Im_1*, in the 10 bit example spanning a total HDR luma range RcTot_Im1 of 1024 values (we only elucidate the concepts which luma which is currently the most popular grey-correlate in image encoding, but also there one may easily understand our invention with an encoding which defines e.g. the colors with a linear luminance measure). In this code definition example we allow negative luma values. The LDR part may be found with a standard 2.2 gamma mapping CMAP_L in the LDR code subrange R_LDR, corresponding also to scene luminances between characteristic luminances gt2 and gt3. Metadata may simply transmit these characteristic luminances gt2 and gt3, so that a system needing the image encoding for generating driving values for an LDR legacy display need only select the values in that range, and they are already correctly normalized if they start at luma Y_out zero and end at luma 255 (i.e. if these values are used for the characteristic lumas demarcating the LDR range cLDRl and cLDRh, they need not even be transmitted or co-stored in principle). The negative values may be used here for representing with a first HDR mapping CMAP_H1 (of the total HDR mapping) the dark regions of dark mode 204. A second HDR (sub)mapping may map the brighter HDR/scene image pixels, and it may involve any useful functional shape (appropriately mapping to the available HDR subregion of the output image lumas, i.e. HDR range R_LEffs_HDR), e.g. determined by allocating an optimal amount of luma codes for representing the internal textures of several regions with their own optimal precision, or by taking into account what receiver-side renderings will typically look like for these subregions and already putting them in the approximately right luma subranges, etc. gt4 is a characteristic luminance where something important starts, e.g. it may be as simple as where the sunny outdoors pixel luminances stop and the light source luminances start (e.g. the HDR grading may have been done in such a way that these regions are non-overlapping and adjacent in the color transformed HDR picture IM_HDR_in* to be encoded). For the receiving side this characteristic luminance is very useful, since it can now optimally tune the rendering of its bright regions, e.g. render the lamps with an excessively high output luminance if the display luminance range allows this, or vice versa, if not many bright colors are available above the rendering of the LDR part, optimally allocate display luminances to both the sunny outdoor pixels and the lamps. This gt4 may aid in image analysis methods at the receiving side (since this is a human-determined meaningful value), but it may also parametrize simple color transform functions at the receiving side like stretches or offsets. One also sees that because of the abolishing of the simple continuity property of the encoding, one may encode all kinds of gaps (as between gt1 and gt2) and overlaps, or other multiple redundant codings etc.

Further useful characteristic grey value annotations may be included in the output signal S, e.g. a characteristic luma gCdk may form a demarcation between two semantic image-subregions which are encoded with the LDR part. This may be used e.g. in an algorithm for improving the brightness of darker regions, e.g. under viewer control.

Shown is also a possibility of selecting another LDR range R_OTHSEL_LDR, by e.g. a transcoder, which will typically also have a tone or color mapping unit. In that example we have, e.g. by applying a soft clipping strategy, included somewhat more of the dark and bright regions. This has as final psychovisual effect that more of the dark regions become visible, and as good as possible some additional bright HDR effects are included (e.g. whereas often the outside sunny region is strongly clipped in an LDR image, one may carefully select to include more colors, be it too desaturated).

Figure 5:
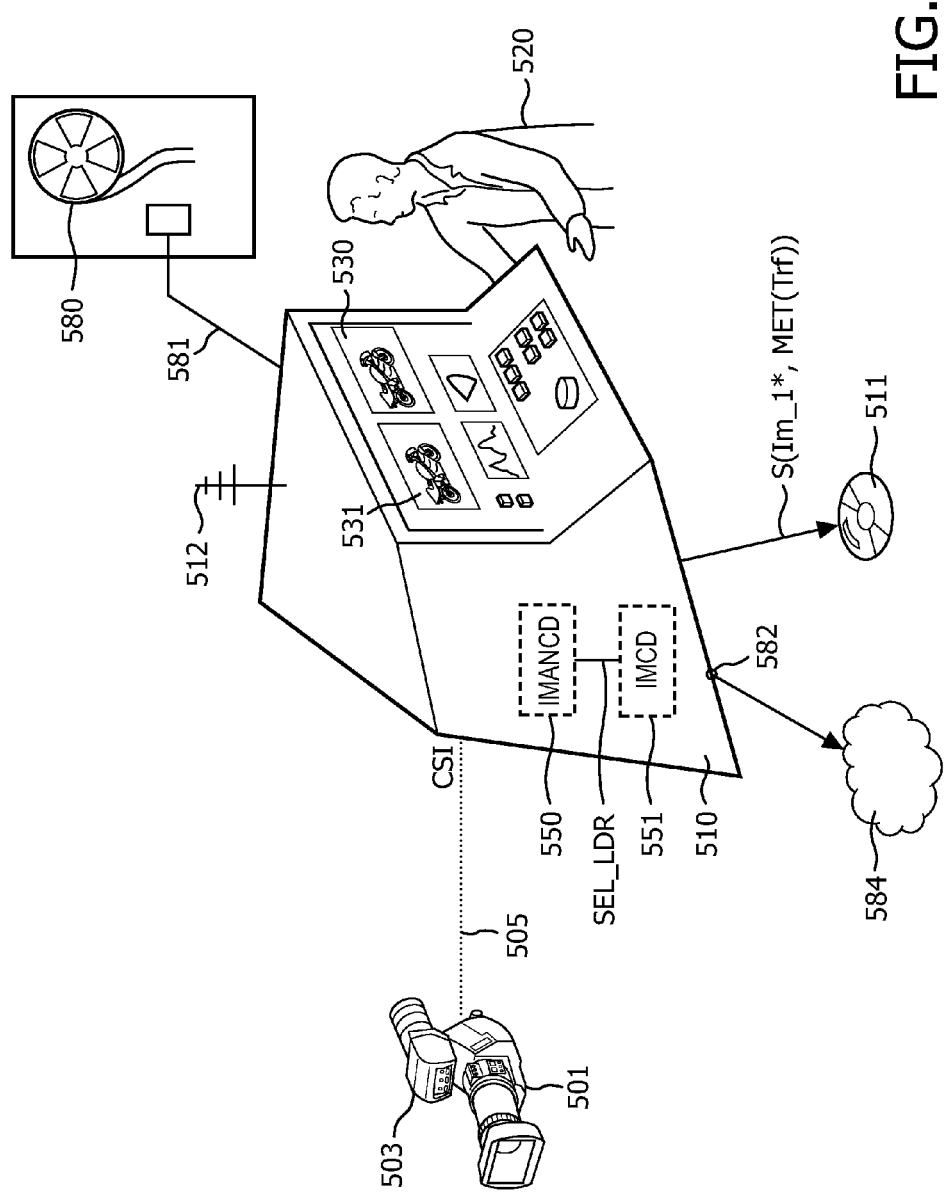
FIG. 5 schematically illustrates an encoding side system, which may be operated by a color grader.

FIG. 5 shows an exemplary system embodying some of the present inventive concepts in a movie creation system. The HDR scene is captured with a large dynamic range camera 501 capable of capturing the HDR range Range_HDR, and the captured image may be watched on a camera display 503 (preferably also HDR, although it could emulate HDR, e.g. by using a sliding scale, or some tone mapping, or pseudocolors, etc.). From thereon, the image is sent over signal connection 505 (network, or wireless (satellite), etc.) to an image processing device 510. Depending on the use scenario, for real life broadcast this may be an apparatus in a director's booth or truck. In this case grading may be reduced to a minimum, and the mapping may be simple and only applied at a few time instances: e.g. a single calibration step generating CMAP_L and CMAP_H prior to the start of the program, and in case deviation with reality becomes too strong and the rendered images on review start looking less desirable an upgrade during the commercials. In a movie creation scenario, it may be (offline, at a later moment in a color grading studio) a grading apparatus of a grader 520. In the former case purely automatic image analysis may be done. In the latter scenario it may be applied as a starting point for a human grading, i.e. in the present example we assume that a semi-automatic processing is done, with finalization by the grader 520. Note that the same principles may be applied in any intermediate or further step (e.g. remastering a previously graded signal for new applications). E.g. at the capturing side a DOP may already (pre)specify the LDR/HDR composition of the scene in resultant images Im_LDR and Im_HDR, however, the grader 520 may re-specify that. E.g., he may via the appropriate tone mapping to an intermediate 32 bit linear representation, shift (or copy) some luminance levels of the encoded data of say highlights from the LDR image to the HDR image, or vice versa, thereby obtaining a modified LDR and/or HDR encoded image. He may typically be looking at several gradings and/or encodings of the same scene, e.g. by toggling or looking side by side at a HDR version on a HDR reference display 531, and an LDR version on an LDR reference display 530. Therewith he can optimize what each of typical classes of final viewers will get to see, and balance the quality of encoding of each of these signals, e.g. by varying subranges of the output Im_1*. He can store the final graded image(s) Im_1* on a data carrier 511. Possibly he can also store further metadata describing the meaning of the Y codes, like by specifying a mapping function Trf mathematical form or LUT, etc.

Inside the image processing device 510 are imaging processing subunits which will do the actual per pixel calculation work and produce the final output and guide and help the grader. Of course there will be an image encoding unit 551 which is arranged to derive the coded image Im_1*, on the basis of the camera input signal CSI and the grader preferences (typically handled via a UI module).

Furthermore, there will typically be an image analysis unit 550 which analyzes the image aiding in the coding. This unit may look at properties of histogram modes, and distribution of colors over certain subregion of input images like the HDR input image, possibly further aided by other image analysis components like texture or motion analysis, parametrized geometrical object model estimation, etc. It may output (again typically aided by human intervention) a data structure SEL_LDR characterizing what it thinks the LDR contribution in the HDR signal is like, which in simple embodiments may be as simple as a range, and possibly some further information on how the grey values distribute within that range (e.g. a function dependent on the occurrence statistics of the pixel colors in the HDR image regions falling within the LDR range). In more complex embodiments it can be such a complex description data structure that it also comprises semantic information of the LDR regions, such as where faces reside (this being linkable or linked to their colors), etc.

The image processing device 510 (and grader) of this example also has an access link 581 to legacy content 580 like e.g. an old movie (of course the skilled person understands that this functionality may be embodied in a different apparatus, and performed in a different stage of the imaging chain, by a different grader or computer graphics artist). With the present embodiments, the grader may add HDR effects to an old LDR movie, and the present embodiments are very useful in that the LDR encoding need not be changed ("damaged"), since it can be encoded as the LDR part of Im_1* or at least a very simple minor and largely reversible transformation thereof. And then all the HDR regions or effects may be encoded in the remaining ranges of Im_1*. Also shown is another output 582 for providing another encoding Im_2*, e.g. a different encoding for another communication path, which may be e.g. a lower quality encoding via the internet 584 for portable displays which on the one hand may have reduced quality needs for the LDR part, and on the other hand will apply a severe transformation on the HDR parts, to still render it somewhat, but largely distorted (yet with the same ease as high quality systems can derive their needed final encodings based on the encoding embodiments of this invention).

Further down the chain there may be video improvement services (e.g. on a remote server) which may improve the encoded data in Im_1* (by adapting the LDR and/or HDR part, e.g. by remapping), e.g. upon subscription to condition the image for a specific rendering environment. One can think e.g. of increasing the range R_Norml_LDR at the cost of the HDR regions, for display systems which are mostly LDR anyway, like a mobile phone.

An antenna 512 may receive any data, or transmit it further, e.g. images, operation instructions, etc.

Figure 6:
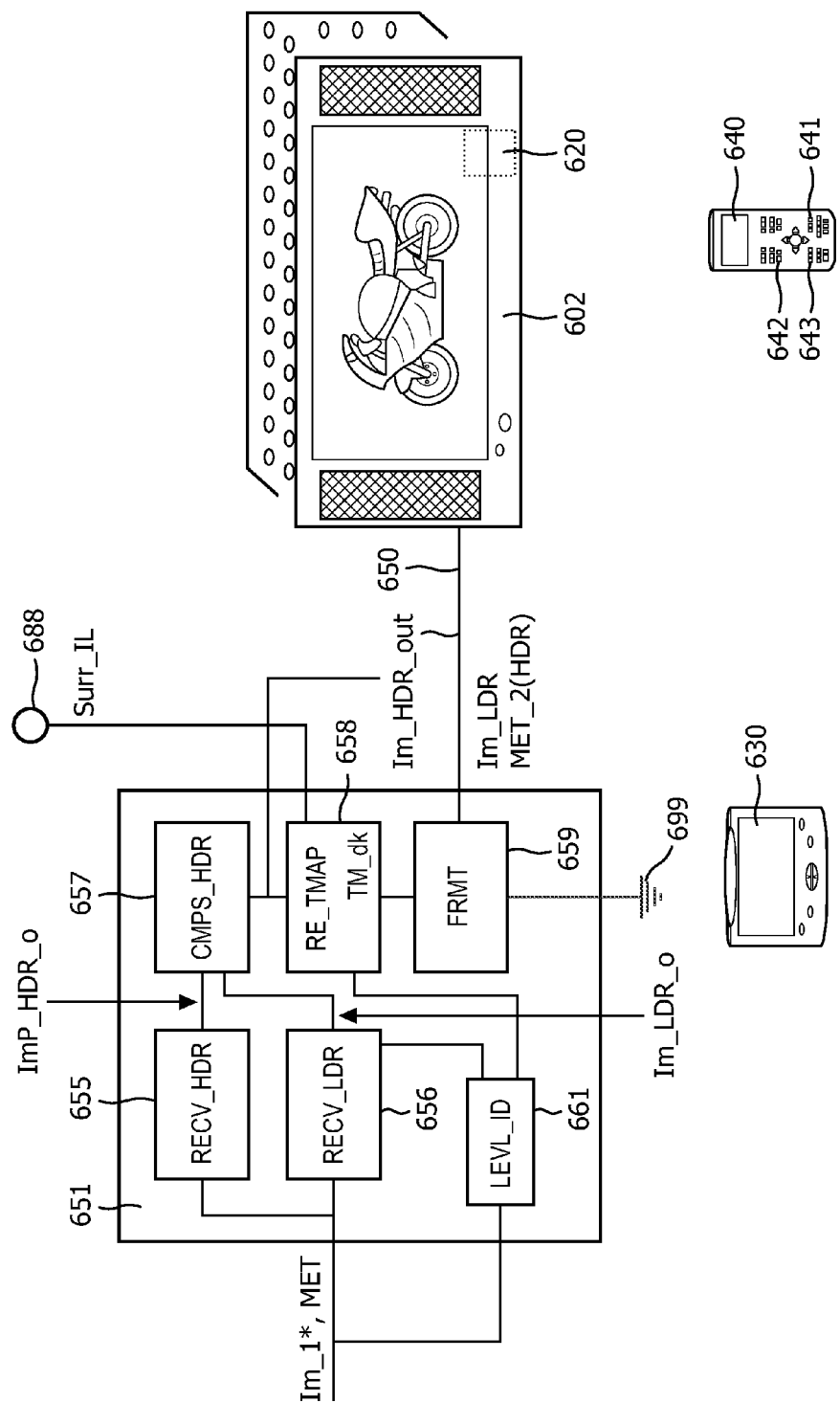
FIG. 6 schematically illustrates a decoding side system, which may be e.g. a consumer home display system comprising such apparatuses as a main television, and a portable image viewer.

FIG. 6 shows an example of a rendering system at a receiving side. It may be composed of e.g. a video processing box 651 (which may e.g. be a settopbox or a general purpose PC computer, which box may comprise a BD reading unit, etc.), and a display, which in this example is a LED backlighted LCD television 602, but it may also be an OLED, projector, simple LDR display, etc.

The video processing box 651 has an input, which depending on the system may e.g. be a disk reader, a slot for a memory card and connected memory management unit, a bus to connect an external apparatus, an antenna and receiver with demodulator, a network connection whether cable or wireless, etc. Typically a receiver will do all the signal deformatting (including description and whatever is necessary), but this being coming general knowledge of another technical field, we will simply assume the encoded image Im_1* comes in as a RAW image, be it with a special luma code mapping definition. As described above the metadata MET can be quite complex, and it may further define how exactly the coding happened and hence how the decoding should be done, but also possible it may further define what can be done with the image once it is decoded (which we schematically show with Im_HDR_out, which may for simplicity be assumed in a linear luminance representation, although some other master code/color space definition could be used).

A characteristic grey value identification unit 661 may be comprise to extract those specific codes from the metadata MET (or even further derive them based on image analysis), and then that information may be used e.g. in tone remapping.

An LDR recovery unit 656 is arranged to apply all necessary functions to determine the LDR part in the coded image Im_1*, so typically it will determine a low dynamic range of luminances (R_Norml_LDR), which may then be used in cutting the LDR image out of Im_1*. Typically an image composition unit 657 will generate the final HDR image Im_HDR_out, because it will also receive the HDR parts from a HDR recovery unit 655, and these parts (e.g. embodied as an LDR image Im_LDR_o+the HDR partial images ImP_HDR_o) can then composed all together into e.g. a linear luminance domain after applying the appropriate inverse mapping (CMAP_L$^{-1}$, and CMAP_H$^{-1}$). There may also be further tone mapping involved prior to sending the HDR image to the display (whether as a direct driving signal or an encoding needing further transformation by the display), done by tone mapping unit 658. This tone mapping unit may condition the signal for better viewing quality, e.g. apply a brightening transformation with transformation function TM_dk, on the pixels with luma below gCdk (or in fact the corresponding luminance after mapping to Im_HDR_out by unit 657). The mapping may be dependent on a measure Surr_IL of the properties of the viewing environment, e.g. as recorded by a luminance meter 688 at the site of the box or tv or viewer (e.g. on the remote control) etc. Of course there may be a final formatter 659, which conditions the signal e.g. according to a connection specification like e.g. a HDMI standard (an example of a connection e.g. a cable 650). Furthermore, to allow the display to do its own intelligent transformations, the formatter may also send further image encodings, like a variant Im_LDR of the LDR signal, which is no longer easily recognizable in the linear HDR image IM_HDR_out. This allows to display to do its own color mapping (by comprised image processing unit 620), e.g. under user control. Further metadata MET_2(HDR) may be transmitted, describing at least the transmitted HDR signal, such as e.g. how it was reconditioned by unit 658. The television may e.g. use this information differently dependent on whether it is the main image or a small PIP.

The decoding unit 651 may also comprise or be connected to an antenna 699 and transmit the same or another HDR output image to e.g. a portable display apparatus 630.

As an example of how the present embodiments and easy re-renderings work with a user interface can be shown with an "information aware brightness control", e.g. an improved brightness button 641 on a remote control. Instead of blindly adding offsets to all the pixel luminances of Im_HDR_out, upon pressing this button the video processing box 651 or television may apply a new tone mapping strategy which e.g. remaps the information of the dark lobe 204 different than the rest of the pixels, so getting a much better visibility of the dark objects. The various characteristic grey levels can strongly aid by parametrizing such actions, by defining what has to be done with different subranges (stronger brightening, a coordinated amount of lesser brightening, identity transform).

The present embodiments allow improved user-interface commands at the rendering side. A more intelligently adapting relighting button 642 or more intelligent contrast improvement button 643 may make use of all the metadata, but also the encoded subranges. E.g. the contrast button may be applied to a facial region which is in the dark and ill-illuminated. Even when correctly illuminating, demarcating that range with characteristic grey values may allow processing it differently. E.g., a modifying gamma function to be applied to the face region may depend on the metadata.

Figure 7:
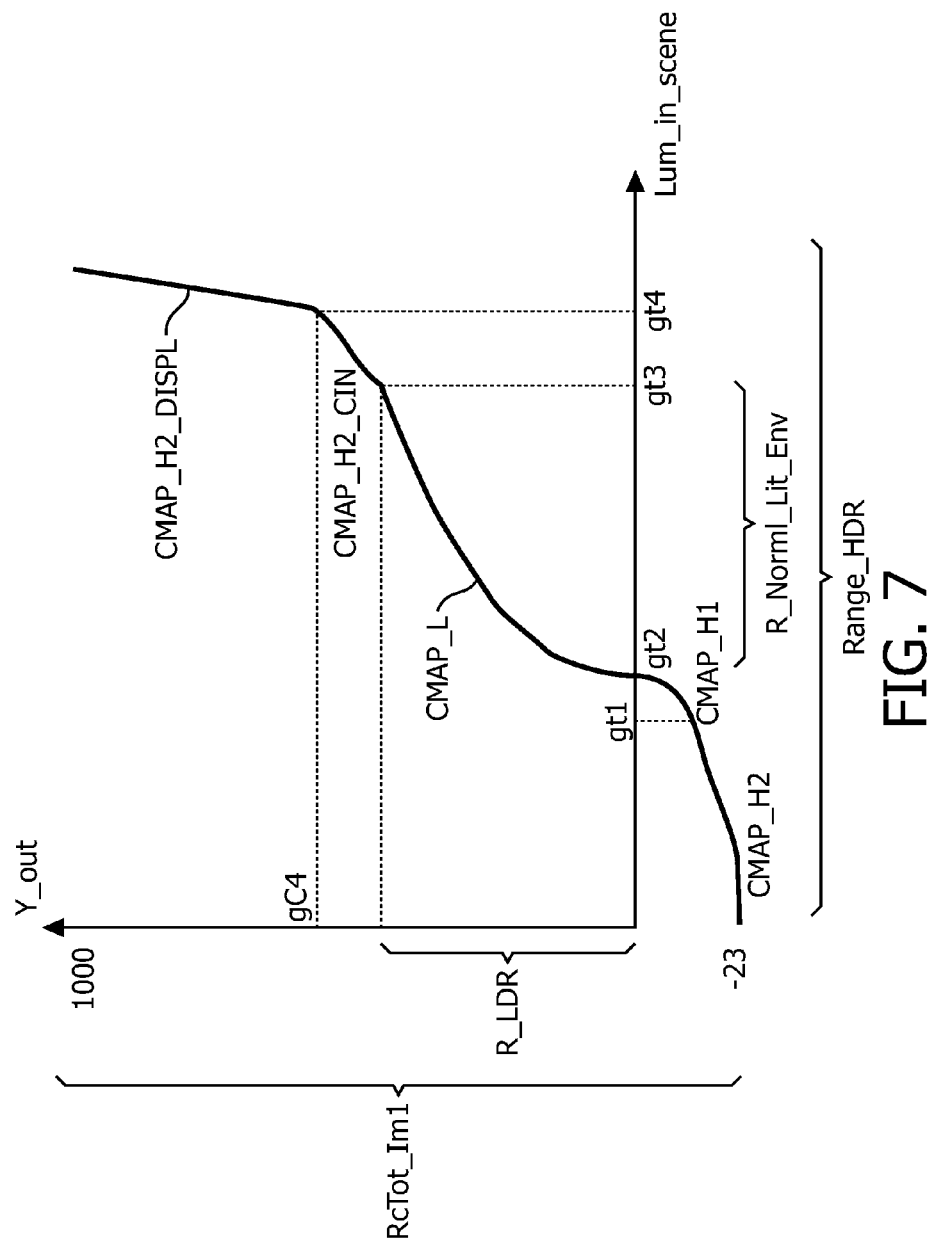
FIG. 7 schematically illustrates an embodiment which allows three gradings important for future movie encoding (master grade for theaters, LDR display home grade, and HDR home grade) to be encoded in one signal (e.g. 10 bit) according to the present invention.

Note that the present invention doesn't exclude having more than 1 HDR ranges or subranges in addition to an LDR range (or potentially in principle even several LDR ranges or subranges), and in particular it can use this freedom to merge several grades, as will be elucidated with the example of FIG. 7. In particular the freedom of having no longer a simple continuous non-linear relationship between the grey values along the range or any transformation thereof, is a great advantage. One can see all classical tone mapping transforms as a kind of "spring" pushing some of the grey value regions to somewhere, which may or may not be desirable. E.g. a gamma function is an example of such a simplistic transformation. It essentially keeps the white fixed, and mostly acts on the darker regions of the luminance scale. It may make some middle greys too dark, or reserve too many codes for the darker regions. Having a single luminance range defined by a continuous allocation function and no further precise subcontrol always involves balancing clipping whites or blacks with precision. Note that (even for those simple continuous "spring-type" transformations, such as occur when transforming to different color representation systems) one must make a distinction between a color/luminance coding and a rendering. Luma code-values, unless when directly applied to a display such as it happens in classical television chains like PAL or MPEG2, need not directly correspond to exact to be rendered luminances for image regions, since there may always be an intermediate transform implementing rendering requirements such as display and/or viewing environment characteristics, but there should be enough code values to reasonably characterize the object present. I.e. when can decouple the lighting-based "look" of a scene as encoded in an image, from the coding of captured scene object textures. I.e. the present invention may identify e.g. several illumination regions (some lighted regions, intermediate regions, dark regions), yet encode them as if they were all perfectly illuminated (where they may not have been so during camera capture), i.e. with an optimal sufficient range/amount of code values. And then later one may apply the required rendering look. E.g. an LDR display or apparatus may decide whether it wants to show a dark region of dark pixel luminance somewhat brightened, or as indistinguishable blacks. E.g. when a movie is scanned with a telecine, the forgiving slope of the toe and especially shoulder of the movie may contain a lot of information. I.e., e.g., even when a dark region contains a lot of noise, the scanned dark regions may e.g. after an intelligent noise reduction or general object improvement algorithm (which may involve complex operations like e.g. computer graphics special effects inpainting mathematical textures on the dark objects) encode this dark region in a final digital HDR encoding with a lot of code values for that dark region. Or an optimal amount of code values may be determined based on expectations what still may be done usage wise (e.g. rendering wise) with such dark regions, which may be less important. An LDR system may then e.g. brighten up this region until it falls in the middle of its luma code range, with far lesser artefacts than if it was naively encoded with only a few of the darkest code values.

FIG. 7 now schematically shows how one may integrate three important gradings for a movie producer (of course similar schemes may be constructed e.g. for television news reporting, or game creation) in a single HDR image encoding structure as an example of the present invention embodiments. Suppose (although of course the movie may have been shot on classical celluloid) that the movie RAW signal is shot on a digital camera such as an ARRI or a RED. The first grade is the master grade for the movie theaters (whether printed on classical film or projected digitally). This grade may be seen as a HDR grade, as firstly the creator will see it as a high quality grade, and secondly a movie theater has reasonable good rendering characteristics. The rendering may be performed in the dark, but visual adaptation for that can largely be done by simple mathematical mapping functions. Although intrapicture contrast may be reduced due to such factors as the projection equipment (and of course lights in the theater such as safety lights), interpicture dynamic contrasts may be good, and one may typically render in a convincing way both dark horror environments and a sunny outdoors. The encoding typically takes into account e.g. the grey value behavior of a celluloid movie. So in this master grade one may want to with good precision encode everything from black objects in dark environments (which can be discriminated when adapted to a dark environment, but what is most important is not so much the actual luminance or any code-representation thereof, but rather the psychological impact thereof, i.e. that a black region never looks quite so dark in a bright rendering as it will look in a dark one) to bright lights such as a flash light shining towards the observer (which in a movie theater will be largely a psychological interpretation of highly bright, but on some HDR displays one may really create very bright regions). A second grading may be a HDR grading for electronic display in home environments (which we shall call "home HDR grading"), such as may be offered via an HDR television pay channel. It may largely coincide with the master grade (since they may typically be related by a simple mapping function to approximately maintain appearance in a different rendering environment), yet it may e.g. contain less of the dark codes, and more of the bright codes. Note that any finetuning of some regions may be encoded with metadata transformation functions, but in particular also a recoding of pixel values, in which case with the present invention there may be a dual coding in the HDR signal of say some bright pixel region. E.g. the range of pixel values of a lamp which luma may have been subdued in the master grade may be encoded in the CMAP_H2_CIN range for the cinema grade, and again in the CMAP_H2_DISPL range in a different way, which can be done e.g. in a pixel interlaced way (i.e. a checkerboard pattern, which can be filtered before rendering).

Typically however a first category of lamps will fall within a range allocated for the bright regions of the master grade for cinema theaters, namely CMAP_H2_CIN, and other very bright lamps may be encoded in another higher range allocated in the final HDR signal for the home HDR grading. A typical realization may e.g. encode these very bright regions (in any scene-assumed representation, e.g. an intermediate linear luminance color space in the grading apparatus also creating the final HDR signal representation) solely in the home HDR subrange CMAP_H2_DISPL. The electronic cinema projector in the theater will then apply the final rendering transform changing that code to a usable value which actually amounts to the same thing as if the image region was encoded in the upper parts of CMAP_H2_IN. This range CMAP_H2_DISPL may be so defined that it has e.g. a very steep slope, allowing for very bright light regions, but with lesser detail. This means that e.g. even a supernova could be encoded, which really cannot be faithfully rendered on any of the near future displays, but then the display can use these different object code values to convert to appropriate renderable display space driving values.

We have also given two examples of dark region encodings, with CMAP_H1, resp. CMAP_H2. The first one may e.g. correspond to less dark regions that one may want to renderable values for electronic home displays (typically in brighter viewing environments). One need not include those in a typical LDR illumination range, but can encode them in a lower subrange, since in fact they are not really LDR anymore. But then a legacy LDR imaging system will behave reasonable if it cuts out the LDR part (in which case these values are rendered as the darkest black), yet a smarter LDR system (at least with an LDR display capability) may e.g. construct a new LDR driving signal by locally mapping those lesser dark code values to brighter, displayable driving values (typically with an algorithm balancing discriminatability of the texture variations versus the darkness required for the total image look). The CMAP_H2 region may then contain even darker regions which are mainly of interest for cinema projection. We hence see that this system allows very easy use of the signals both on the display/decoding side and on the creation/encoding side. On the decoding side, as long as the third grade being the LDR display grade (e.g. what one typically does now for DVD or BD creation) is in the CMAP_L part, an LDR system may easily extract it, whether it wants to still do something with the remaining information in the HDR signal or ignore it (i.e. treat all lower values as 0 e.g.). The HDR home display may interpret and use everything apart from the CMAP_H2 region. Also the content creator be highly benefit from this system, in a simplified workflow, and a possibility to coordinate and save everything together (although the system of course also allows transcoding at a later time, but then especially if further metadata as to choices and transformations is co-encoded with the system, at least all grading expertise is already in the signal for later optimization). E.g., he may use whatever strategy to come to the LDR part. Depending on his quality criteria, he could just e.g. fix some mapping strategy of an LDR part, and take a look simultaneously on some LDR display whether the LDR grade looks reasonable (or annotate it e.g. as "good for master grade, to be optimized later in improved home LDR grade"; our system could then generate a second separate HDR signal to be stored on BD, but could also just finetune the original master grade so that the three grades are still reasonably contained in the one HDR coding, i.e. by defining quality criteria for minimizing distortion of the (recoverable) grades as encoded in the single HDR image). A colleague may take a look in the projection room how the master grade looks, and the grader which also checks the LDR grade, may simultaneously look at a HDR reference monitor, such as e.g. a SIM2. Having full and complex control over all the subregions, there definition and embeddings, allows great coding of all these three grades, together, whether one has relaxed or stringent quality criteria. E.g. the LDR part may be smartly defined as the "normally lit environment" (R_Norml_Lit_Env) and the grader may choose that depending on what can be mapped to an LDR range, compared to what he can get away with as to HDR quality. But note that a mapping (which will be co-encoded) may be quite complex. So it is not just that highlights should be clipped in the LDR subrange, which may introduce artefacts when recovering the HDR signal. Since they would have to be reduced in luminance for the LDR rendering anyway, the may be done with such a mapping that the HDR decoding of those bright are still recoverable as the correct bright, in particular after mapping neatly coordinating with HDR object encoded in e.g. the above range CMAP_H2_CIN. So the grader has a lot of freedom to select the main LDR story as encoded in its subrange. I.e. he may e.g. select that mapping CMPA_L purely on information-theoretic principles such as an amount of codes for precise rendering of say faces under non-optimized illumination, or easier later use of the signal (by explicitly excluding some objects as clipped, e.g. a dark region, which is a semantic statement co-encoding), etc. One may e.g. calculate how many code values for a certain subregion of a scene are desirable (e.g. if it is dark and with highly complex spatial object textures not so many), and then intelligently allocate some region of e.g. [0-255]. The code word length as number of bits which needs a memory allocation in any signal definition, and the meaning (luminances in any "scene representation" e.g. a reference display space of {16 bit-defintion_gamma_1,0.1-5000 nit}) are now optimally decoupled and controllable.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in the invention in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components of the invention can be embodied in different variants along any use chain, e.g. all variants of a creation side apparatus like an encoder may be similar as or correspond to corresponding apparatuses at a consumption side of a decomposed system, e.g. a decoder and vice versa. Several components of the embodiments may be encoded as specific signal data in a signal for transmission, e.g. in a use such as technical functioning coordination between various components of the invention present in a total processing chain, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

Any embodiment of the invention, or any data usable according to any philosophy of the present embodiments like video data, may also be embodied as signals on data carriers, which may be removable memories like optical disks, flash memories, removable harddisks, portable devices writeable via wireless means, etc.

Some of the steps required for the operation of any presented method may be already present in the functionality of the processor or any apparatus embodiments of the invention instead of described in the computer program product or any unit, apparatus or method described herein (with specifics of the invention embodiments), such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions covered by the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. An image encoding unit arranged to encode a high dynamic range image, comprising:
  a Low Dynamic Range (LDR) selector for identifying a low dynamic range of luminances, or corresponding range of luma code values, within a total range of luminances covered by the high dynamic range image, the low dynamic range of luminances or corresponding range of luma code values being so large that image information encoded within it is usable for LDR rendering;
  a High Dynamic range (HDR) selector for selecting at least one complementary range within the total range of luminances, comprising mostly luminances not covered by the low dynamic range of luminances;
  a code mapping unit arranged to encode in a first image, having at least a luma component comprising N bit code words, pixel luminances of the high dynamic range image falling within the low dynamic range of luminances to luma code values according to a first mapping, and pixel luminances of the high dynamic range image falling within the at least one complementary range to luma code values according to a second mapping, wherein the first and second mappings map to disjunct subranges of a range of luma code values of the first image.

2. The image encoding unit as claimed in claim 1, comprising a transformation unit arranged to apply a colorimetric transformation to pixel colors of the high dynamic range image having luminances falling within the low dynamic range of luminances, to obtain modified pixel luminances for those pixel colors.

3. The image encoding unit as claimed in claim 1, in which the LDR selector comprises an identification unit to identify the low dynamic range of luminances of the total range of luminances on the basis of an input LDR graded image or metadata characterizing that LDR graded image.

4. The image encoding unit as claimed in claim 3, in which the code mapping unit is arranged to map pixel luminances of the high dynamic range image falling within the low dynamic range of luminances according to the pixel color values encoded in the LDR graded image.

5. The image encoding unit as claimed in claim 1, comprising an image signal formatter arranged to output, in addition to the first image, at least one of a characteristic luminance level or a characteristic luma code value.

6. A method of encoding a high dynamic range image, comprising:
  selecting a low dynamic range of luminances, or corresponding range of luma code values, within a total range of luminances covered by the high dynamic range image, the low dynamic range of luminances or corresponding range of luma code values being so large that image information encoded within it is usable for LDR rendering;
  selecting at least one complementary range within the total range of luminances, comprising mostly luminances not covered by the low dynamic range of luminances;
  mapping to luma codes of a first image having at least a luma component comprising N bit code words, pixel luminances of the high dynamic range image falling within the low dynamic range of luminances to luma code values according to a first mapping, and pixel luminances of the high dynamic range image falling within the at least one complementary range to luma code values according to a second mapping, wherein the first and second mappings map to disjunct subranges of a range of luma code values of the first image.

7. The method as claimed in claim 6, comprising performing a color grading for pixels having luminances within the low dynamic range of luminances.

8. An image decoding unit arranged to obtain a high dynamic range image from a high dynamic range image encoding, comprising:
  a Low Dynamic Range (LDR) recovery unit arranged to determine a low dynamic range of luminances, or corresponding range of luma code values, within a total range of luminances covered by the high dynamic range image, the low dynamic range of luminances or corresponding range of luma code values being so large that image information encoded within it is usable for LDR rendering, and arranged to obtain a low dynamic range image from the high dynamic range image encoding;
  a High Dynamic Range (HDR) recovery unit arranged to determine at least one complementary range within the total range of luminances, comprising mostly luminances not covered by the low dynamic range of luminances, and arranged to determine at least one high dynamic range subimage from the high dynamic range image encoding corresponding to that at least one complementary range;
  an image composition unit arranged to compose the high dynamic range image from the low dynamic range image and the at least one high dynamic range subimage, whereby the low dynamic range image and the at least one high dynamic range subimage cover largely non-overlapping luminance subranges of the high dynamic range image.

9. The image decoding unit as claimed in claim 8, comprising a characteristic grey value identification unit, arranged to extract from input metadata at least one of a characteristic luminance level or a characteristic luma code value.

10. The image decoding unit as claimed in claim 9, in which the LDR recovery unit is arranged to determine the low dynamic range of luminances on the basis of the characteristic luminance level or the characteristic luma code value.

11. The image decoding unit as claimed in claim 9, comprising a tone mapping unit arranged to transform pixel colors at least when their luminances or lumas fall in a subrange of luminances or lumas of the high dynamic range image, as defined by the characteristic luminance level or the characteristic luma code value, respectively.

12. The image decoding unit as claimed in claim 11, in which the tone mapping unit is arranged to apply a brightening transformation of at least pixel colors having luminances or lumas below a certain threshold.

13. A method of image decoding to obtain a high dynamic range image from a high dynamic range image encoding, comprising:
  determining a low dynamic range of luminances, or corresponding range of luma code values, within a total range of luminances covered by the high dynamic range image, the low dynamic range of luminances or corresponding range of luma code values being so large that image information encoded within it is usable for LDR rendering, and obtaining a low dynamic range image from the high dynamic range image encoding;
  determining at least one complementary range within the total range of luminances, comprising mostly luminances not covered by the low dynamic range of luminances, and determining at least one high dynamic range subimage from the high dynamic range image encoding corresponding to that at least one complementary range;
  composing the high dynamic range image from the low dynamic range image and the at least one high dynamic range subimage, whereby the low dynamic range image and the at least one high dynamic range subimage cover largely non-overlapping luminance subranges of the high dynamic range image.

14. A computer program, stored on a non-transitory computer readable medium, comprising software for carrying out the method of claim 6.

15. A computer program, stored on a non-transitory computer readable medium, comprising software for carrying out the method of claim 13.

* * * * *